United States Patent
Koepfer et al.

(10) Patent No.: US 11,254,693 B2
(45) Date of Patent: Feb. 22, 2022

(54) BENZOTHIAZOLE-CONTAINING SILANES, METHOD FOR THE PREPARATION AND USE THEREOF

(71) Applicant: Evonik Operations GmbH, Essen (DE)

(72) Inventors: Alexander Koepfer, Bernau im Schwarzwald (DE); Oliver Klockmann, Niederzier (DE); Olga Kufelt, Hannover (DE); Stefanie Mayer, Rheinfelden (DE); Caren Roeben, Essen (DE); Sebastian Rosenstingl, Loerrach (DE); Andre Wehmeier, Cologne (DE)

(73) Assignee: Evonik Operations GmbH, Essen (DE)

( * ) Notice: Subject to any disclaimer, the term of this patent is extended or adjusted under 35 U.S.C. 154(b) by 217 days.

(21) Appl. No.: 16/606,012

(22) PCT Filed: Apr. 25, 2018

(86) PCT No.: PCT/EP2018/060560
§ 371 (c)(1),
(2) Date: Oct. 17, 2019

(87) PCT Pub. No.: WO2018/206291
PCT Pub. Date: Nov. 15, 2018

(65) Prior Publication Data
US 2020/0048285 A1  Feb. 13, 2020

(30) Foreign Application Priority Data

May 8, 2017  (DE) ............... 10 2017 207 715.8

(51) Int. Cl.
*C08K 3/36* (2006.01)
*C07F 7/18* (2006.01)
(52) U.S. Cl.
CPC ............ *C07F 7/1804* (2013.01); *C07F 7/188* (2013.01); *C08K 3/36* (2013.01)
(58) Field of Classification Search
CPC ........... C07F 7/1804; C07F 7/188; C08K 3/36
USPC ...................................................... 524/430
See application file for complete search history.

(56) References Cited

U.S. PATENT DOCUMENTS

| 5,663,358 | A  | 9/1997  | Cohen et al.     |
|-----------|----|---------|------------------|
| 6,465,581 | B1 | 10/2002 | Wideman et al.   |
| 7,662,874 | B2 | 2/2010  | Korth et al.     |
| 7,705,076 | B2 | 4/2010  | Korth et al.     |
| 9,029,450 | B2 | 5/2015  | Albert et al.    |
| 9,290,523 | B2 | 3/2016  | Rosenstingl et al. |
| 9,388,201 | B2 | 7/2016  | Roeben et al.    |
| 9,440,998 | B2 | 9/2016  | Moser et al.     |
| 9,527,873 | B2 | 12/2016 | Roeben et al.    |
| 9,598,562 | B2 | 3/2017  | Blume et al.     |
| 9,745,330 | B2 | 8/2017  | Blume et al.     |
| 9,981,995 | B2 | 5/2018  | Peterle et al.   |
| 9,994,596 | B2 | 6/2018  | Krafezyk et al.  |

FOREIGN PATENT DOCUMENTS

| CN | 102344462 | A | * | 2/2012 |
| CN | 102344462 | A |   | 2/2012 |
| CN | 103923115 | A | * | 7/2014 |
| CN | 103923115 | A |   | 7/2014 |
| EP | 0 785 206 | A1 |   | 7/1997 |
| KR | 101868983 | B1 | * | 6/2018 |

OTHER PUBLICATIONS

International Search Report dated Jul. 23, 2018 in PCT/EP2018/060560 filed Apr. 25, 2018.
U.S. Appl. No. 15/503,238, filed Feb. 10, 2017, 2017/0233552 A1, Caren Roeben, et al.
U.S. Appl. No. 15/781,257, filed Jun. 4, 2018, 2018/0346696 A1, Caren Roeben, et al.
U.S. Appl. No. 16/201,495, filed Nov. 27, 2018, 2019/0161600 A1, Caren Roeben, et al.

(Continued)

*Primary Examiner* — Kelechi C Egwim
(74) *Attorney, Agent, or Firm* — Oblon, McClelland, Maier & Neustadt, L.L.P.

(57) ABSTRACT

The invention relates to benzothiazole-containing silanes of the formula I $$(R^1)_n(R^2)_{3-n}Si-R^3-S_x\text{-benzothiazolyl} \quad (I)$$

which are prepared by reacting benzothiazole-containing silanes of the formula II $$(R^1)_3Si-R^3-S_x\text{-benzothiazolyl} \quad (II)$$

with a compound of formula III $$R^2-H \quad (III).$$

The benzothiazole-containing silanes of the formula I can be used in rubber mixtures.

10 Claims, No Drawings

(56) References Cited

OTHER PUBLICATIONS

U.S. Appl. No. 16/201,568, filed Nov. 27, 2018, 2019/0161506 A1, Caren Roeben, et al.
U.S. Appl. No. 15/791,111, filed Oct. 23, 2017, 2018/0112066 A1, Roland Krafezyk, et al.
Jacek Guliński, et al., "Synthesis of organofunctional silanes with sterically hindered substituents at silicon atoms," Applied Organometallic Chemistry, vol. 15, 2001, pp. 649-657.

* cited by examiner

BENZOTHIAZOLE-CONTAINING SILANES, METHOD FOR THE PREPARATION AND USE THEREOF

The invention relates to benzothiazole-containing silanes, to processes for preparation thereof and to the use thereof.

It is known that silanes can be used as adhesion promoters. For instance, aminoalkyltrialkoxysilanes, methacryloxyalkyltrialkoxysilanes, polysulfanalkyltrialkoxysilanes and mercaptoalkyltrialkoxysilanes are used as adhesion promoters between inorganic materials and organic polymers, and as crosslinking agents and surface modifiers (E. P. Plueddemann, "Silane Coupling Agents", 2$^{nd}$ Ed. Plenum Press 1982, p. 153-181).

These adhesion promoters or coupling or bonding agents form bonds both to the filler and to the elastomer and thus bring about good interaction between the filler surface and the elastomer.

WO2003097734, U.S. Pat. No. 6,465,581 and Macromolecules 2002, 35, 10026-10037 disclose silanes of the formula $(RO)_a(R'O)_{3-a}Si—Z—S_x$-Bt where Bt is a benzothiazole group, which lead to rubber mixtures having elevated strengthening.

CN 104045664 A, CN 102344462 A and 103923115 A disclose monosulfidic benzothiazole silanes.

O. Klockmann, J. Hahn, H. Scherer, "The Chemistry of Mercapto Silanes", International Rubber Conference 2009, Nuremberg, A. Wehmeier, O. Klockmann, "Solutions for processing challenges with an advanced silica-silane system", 180th Technical Meeting of the rubber Division, American Chemical Society 2011, Cleveland, p. 3 and C. Roeben, "Application of the high performance silane Si 363™ in green tire tread compounds", tire technology conference 2015, Cologne, p. 5-6 disclose silanes having a benzothiazyl group coupled to a silica, which form during the process for production of a rubber mixture.

A disadvantage of the known benzothiazole-containing silanes is the high mixture viscosities of the resulting raw rubber mixtures, which lead to poor processing characteristics of these mixtures.

It is an object of the present invention to provide benzothiazole-containing silanes having improved processing characteristics compared to the silanes known from the prior art with an equivalent rubber values profile.

The invention provides a benzothiazole-containing silane of the formula I

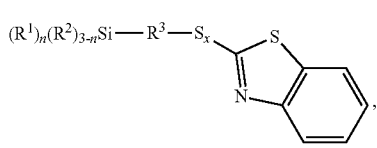

where $R^1$ is the same or different and is an $R^4O—$ group with $R^4$ being H, methyl, ethyl, propyl, C9-C30 branched or unbranched monovalent alkyl, alkenyl, aryl or aralkyl group, where $R^2$ is an alkyl polyether group $—O—(R^6—O)_m—R^6$, where $R^5$ is identical or different and is a branched or unbranched, saturated or unsaturated, aliphatic divalent C1-C30 hydrocarbon group, preferably $CH_2—CH_2$, $CH_2—CH(CH_3)$, $—CH(CH_3)—CH_2—$, $CH_2—CH_2—CH_2$ or mixtures thereof, m is 1 to 30, preferably 2 to 20, more preferably 2 to 15, even more preferably 3 to 10, exceptionally preferably 4 to 7, and $R^6$ is a branched or unbranched C1-C30-alkyl group, preferably C11-C30-alkyl group, more preferably C12-C20-alkyl group, even more preferably C12 to C15-alkyl group, $R^3$ is a branched or unbranched, saturated or unsaturated, aliphatic, aromatic or mixed aliphatic/aromatic divalent C1-C30 hydrocarbon group, x=2-10, preferably 2-4, more preferably 2, and n=0, 1 or 2, preferably 2.

Benzothiazole-containing silanes may be mixtures of benzothiazole-containing silanes of the formula I.

The process product may comprise oligomers which form through hydrolysis and condensation of the alkoxysilane functions of the benzothiazole-containing silanes of the formula I.

The benzothiazole-containing silanes of the formula I may be applied to a support, for example wax, polymer or carbon black.

$R^3$ may preferably be $—CH_2—$, $—CH_2CH_2—$, $—CH_2CH_2CH_2—$, $—CH_2CH_2CH_2CH_2—$, $—CH(CH_3)—$, $—CH_2CH(CH_3)—$, $—CH(CH_3)CH_2—$, $—C(CH_3)_2—$, $—CH(C_2H_5)—$, $—CH_2CH_2CH(CH_3)—$, $—CH(CH_3)CH_2CH_2—$, $—CH_2CH(CH_3)CH_2—$, $—CH_2CH_2CH_2CH_2CH_2—$, $—CH_2CH_2CH_2CH_2CH_2CH_2—$, $—CH_2CH_2CH_2CH_2CH_2CH_2CH_2—$, $—CH_2CH_2CH_2CH_2CH_2CH_2CH_2CH_2—$, $—CH_2CH_2CH_2CH_2CH_2CH_2CH_2CH_2CH_2—$, $—CH_2CH_2CH_2CH_2CH_2CH_2CH_2CH_2CH_2CH_2—$, $—CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2CH_2CH_2CH_2—$ or

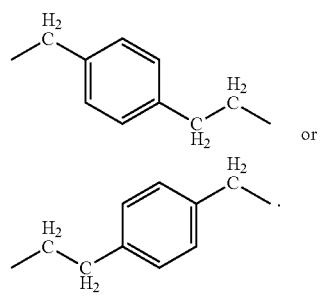

$R^1$ may preferably be methoxy or ethoxy.

$R^2$ may preferably be $—O—(C_2H_4—O)_5—C_{11}H_{23}$, $—O—(C_2H_4—O)_5—C_{12}H_{25}$, $—O—(C_2H_4—O)_5—C_{13}H_{27}$, $—O—(C_2H_4—O)_5—C_{14}H_{29}$, $—O—(C_2H_4—O)_5—C_{15}H_{31}$, $—O—(C_2H_4—O)_3—C_{13}H_{27}$, $—O—(C_2H_4—O)_4—C_{13}H_{27}$, $—O—(C_2H_4—O)_6—C_{13}H_{27}$, $—O—(C_2H_4—O)_7—C_{13}H_{27}$, $—O—(CH_2CH_2—O)_5—(CH_2)_{10}CH_3$, $—O—(CH_2CH_2—O)_5—(CH_2)_{11}CH_3$, $—O—(CH_2CH_2—O)_5—(CH_2)_{12}CH_3$, $—O—(CH_2CH_2—O)_5—(CH_2)_{13}CH_3$, $—O—(CH_2CH_2—O)_5—(CH_2)_{14}CH_3$, $—O—(CH_2CH_2—O)_3—(CH_2)_{12}CH_3$, $—O—(CH_2CH_2—O)_4—(CH_2)_{12}CH_3$, $—O—(CH_2CH_2—O)_6—(CH_2)_{12}CH_3$, $—O—(CH_2CH_2—O)_7—(CH_2)_{12}CH_3$,

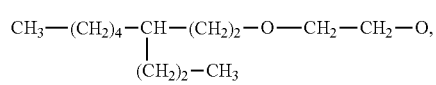

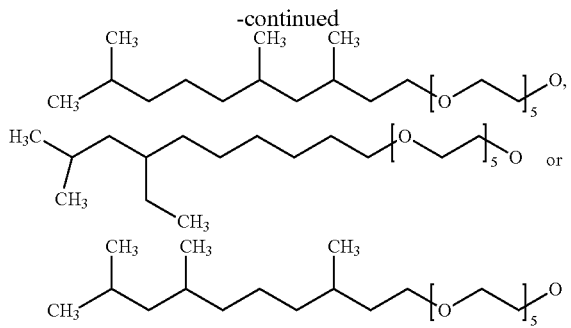

Benzothiazole-containing silanes of the formula I may be:

[C₁₁H₂₃O—(CH₂—CH₂O)₂](EtO)₂Si(CH₂)₃ S₂Bt,
[C₁₁H₂₃O—(CH₂—CH₂O)₃](EtO)₂Si(CH₂)₃ S₂Bt,
[C₁₁H₂₃O—(CH₂—CH₂O)₄](EtO)₂Si(CH₂)₃ S₂Bt,
[C₁₁H₂₃O—(CH₂—CH₂O)₅](EtO)₂Si(CH₂)₃ S₂Bt,
[C₁₁H₂₃O—(CH₂—CH₂O)₆](EtO)₂Si(CH₂)₃ S₂Bt,
[C₁₂H₂₅O—(CH₂—CH₂O)₂](EtO)₂Si(CH₂)₃ S₂Bt,
[C₁₂H₂₅O—(CH₂—CH₂O)₃](EtO)₂Si(CH₂)₃ S₂Bt,
[C₁₂H₂₅O—(CH₂—CH₂O)₄](EtO)₂Si(CH₂)₃ S₂Bt,
[C₁₂H₂₅O—(CH₂—CH₂O)₅](EtO)₂Si(CH₂)₃ S₂Bt,
[C₁₂H₂₅O—(CH₂—CH₂O)₆](EtO)₂Si(CH₂)₃ S₂Bt,
[C₁₃H₂₇O—(CH₂—CH₂O)₂](EtO)₂Si(CH₂)₃ S₂Bt,
[C₁₃H₂₇O—(CH₂—CH₂O)₃](EtO)₂Si(CH₂)₃ S₂Bt,
[C₁₃H₂₇O—(CH₂—CH₂O)₄](EtO)₂Si(CH₂)₃ S₂Bt,
[C₁₃H₂₇O—(CH₂—CH₂O)₅](EtO)₂Si(CH₂)₃ S₂Bt,
[C₁₃H₂₇O—(CH₂—CH₂O)₆](EtO)₂Si(CH₂)₃ S₂Bt,
[C₁₄H₂₉O—(CH₂—CH₂O)₂](EtO)₂Si(CH₂)₃ S₂Bt,
[C₁₄H₂₉O—(CH₂—CH₂O)₃](EtO)₂Si(CH₂)₃ S₂Bt,
[C₁₄H₂₉O—(CH₂—CH₂O)₄](EtO)₂Si(CH₂)₃ S₂Bt,
[C₁₄H₂₉O—(CH₂—CH₂O)₅](EtO)₂Si(CH₂)₃ S₂Bt,
[C₁₄H₂₉O—(CH₂—CH₂O)₆](EtO)₂Si(CH₂)₃ S₂Bt,
[C₁₅H₃₁O—(CH₂—CH₂O)₂](EtO)₂Si(CH₂)₃ S₂Bt,
[C₁₅H₃₁O—(CH₂—CH₂O)₃](EtO)₂Si(CH₂)₃ S₂Bt,
[C₁₅H₃₁O—(CH₂—CH₂O)₄](EtO)₂Si(CH₂)₃ S₂Bt,
[C₁₅H₃₁O—(CH₂—CH₂O)₅](EtO)₂Si(CH₂)₃ S₂Bt,
[C₁₅H₃₁O—(CH₂—CH₂O)₆](EtO)₂Si(CH₂)₃ S₂Bt,
[C₁₆H₃₃O—(CH₂—CH₂O)₂](EtO)₂Si(CH₂)₃ S₂Bt,
[C₁₆H₃₃O—(CH₂—CH₂O)₃](EtO)₂Si(CH₂)₃ S₂Bt,
[C₁₆H₃₃O—(CH₂—CH₂O)₄](EtO)₂Si(CH₂)₃ S₂Bt,
[C₁₆H₃₃O—(CH₂—CH₂O)₅](EtO)₂Si(CH₂)₃ S₂Bt,
[C₁₆H₃₃O—(CH₂—CH₂O)₆](EtO)₂Si(CH₂)₃ S₂Bt,
[C₁₇H₃₅O—(CH₂—CH₂O)₂]₂(EtO)₂Si(CH₂)₃ S₂Bt,
[C₁₇H₃₅O—(CH₂—CH₂O)₃](EtO)₂Si(CH₂)₃ S₂Bt,
[C₁₇H₃₅O—(CH₂—CH₂O)₄](EtO)₂Si(CH₂)₃ S₂Bt,
[C₁₇H₃₅O—(CH₂—CH₂O)₅](EtO)₂Si(CH₂)₃ S₂Bt,
[C₁₇H₃₅O—(CH₂—CH₂O)₆](EtO)₂Si(CH₂)₃ S₂Bt,
[C₁₁H₂₃O—(CH₂—CH₂O)₂]₂(EtO)Si(CH₂)₃ S₂Bt,
[C₁₁H₂₃O—(CH₂—CH₂O)₃]₂(EtO)Si(CH₂)₃ S₂Bt,
[C₁₁H₂₃O—(CH₂—CH₂O)₄]₂(EtO)Si(CH₂)₃ S₂Bt,
[C₁₁H₂₃O—(CH₂—CH₂O)₅]₂(EtO)Si(CH₂)₃ S₂Bt,
[C₁₁H₂₃O—(CH₂—CH₂O)₆]₂(EtO)Si(CH₂)₃ S₂Bt,
[C₁₂H₂₅O—(CH₂—CH₂O)₂]₂(EtO)Si(CH₂)₃ S₂Bt,
[C₁₂H₂₅O—(CH₂—CH₂O)₃]₂(EtO)Si(CH₂)₃ S₂Bt,
[C₁₂H₂₅O—(CH₂—CH₂O)₄]₂(EtO)Si(CH₂)₃ S₂Bt,
[C₁₂H₂₅O—(CH₂—CH₂O)₅]₂(EtO)Si(CH₂)₃ S₂Bt,
[C₁₂H₂₅O—(CH₂—CH₂O)₆]₂(EtO)Si(CH₂)₃ S₂Bt,
[C₁₃H₂₇O—(CH₂—CH₂O)₂]₂(EtO)Si(CH₂)₃ S₂Bt,
[C₁₃H₂₇O—(CH₂—CH₂O)₃]₂(EtO)Si(CH₂)₃ S₂Bt,
[C₁₃H₂₇O—(CH₂—CH₂O)₄]₂(EtO)Si(CH₂)₃ S₂Bt,
[C₁₃H₂₇O—(CH₂—CH₂O)₅]₂(EtO)Si(CH₂)₃ S₂Bt,
[C₁₃H₂₇O—(CH₂—CH₂O)₆]₂(EtO)Si(CH₂)₃ S₂Bt,
[C₁₄H₂₉O—(CH₂—CH₂O)₂]₂(EtO)Si(CH₂)₃ S₂Bt,
[C₁₄H₂₉O—(CH₂—CH₂O)₃]₂(EtO)Si(CH₂)₃ S₂Bt,
[C₁₄H₂₉O—(CH₂—CH₂O)₄]₂(EtO)Si(CH₂)₃ S₂Bt,
[C₁₄H₂₉O—(CH₂—CH₂O)₅]₂(EtO)Si(CH₂)₃ S₂Bt,
[C₁₄H₂₉O—(CH₂—CH₂O)₆]₂(EtO)Si(CH₂)₃ S₂Bt,
[C₁₅H₃₁O—(CH₂—CH₂O)₂]₂(EtO)Si(CH₂)₃ S₂Bt,
[C₁₅H₃₁O—(CH₂—CH₂O)₃]₂(EtO)Si(CH₂)₃ S₂Bt,
[C₁₅H₃₁O—(CH₂—CH₂O)₄]₂(EtO)Si(CH₂)₃ S₂Bt,
[C₁₅H₃₁O—(CH₂—CH₂O)₅]₂(EtO)Si(CH₂)₃ S₂Bt,
[C₁₅H₃₁O—(CH₂—CH₂O)₆]₂(EtO)Si(CH₂)₃ S₂Bt,
[C₁₆H₃₃O—(CH₂—CH₂O)₂]₂(EtO)Si(CH₂)₃ S₂Bt,
[C₁₆H₃₃O—(CH₂—CH₂O)₃]₂(EtO)Si(CH₂)₃ S₂Bt,
[C₁₆H₃₃O—(CH₂—CH₂O)₄]₂(EtO)Si(CH₂)₃ S₂Bt,
[C₁₆H₃₃O—(CH₂—CH₂O)₅]₂(EtO)Si(CH₂)₃ S₂Bt,
[C₁₆H₃₃O—(CH₂—CH₂O)₆]₂(EtO)Si(CH₂)₃ S₂Bt,
[C₁₇H₃₅O—(CH₂—CH₂O)₂]₂(EtO)Si(CH₂)₃ S₂Bt,
[C₁₇H₃₅O—(CH₂—CH₂O)₃]₂(EtO)Si(CH₂)₃ S₂Bt,
[C₁₇H₃₅O—(CH₂—CH₂O)₄]₂(EtO)Si(CH₂)₃ S₂Bt,
[C₁₇H₃₅O—(CH₂—CH₂O)₅]₂(EtO)Si(CH₂)₃ S₂Bt,
[C₁₇H₃₅O—(CH₂—CH₂O)₆]₂(EtO)Si(CH₂)₃ S₂Bt,
[C₁₁H₂₃O—(CH₂—CH₂O)₂]₃Si(CH₂)₃ S₂Bt, [C₁₁H₂₃O—(CH₂—CH₂O)₃]₃Si(CH₂)₃ S₂Bt, [C₁₁H₂₃O—(CH₂—CH₂O)₄]₃Si(CH₂)₃ S₂Bt, [C₁₁H₂₃O—(CH₂—CH₂O)₅]₃Si(CH₂)₃ S₂Bt, [C₁₁H₂₃O—(CH₂—CH₂O)₆]₃Si(CH₂)₃ S₂Bt, [C₁₂H₂₅O—(CH₂—CH₂O)₃]₃Si(CH₂)₃ S₂Bt, [C₁₂H₂₅O—(CH₂—CH₂O)₄]₃Si(CH₂)₃ S₂Bt, [C₁₂H₂₅O—(CH₂—CH₂O)₅]₃Si(CH₂)₃ S₂Bt, [C₁₂H₂₅O—(CH₂—CH₂O)₆]₃Si(CH₂)₃ S₂Bt, [C₁₃H₂₇O—(CH₂—CH₂O)₂]₃Si(CH₂)₃ S₂Bt, [C₁₃H₂₇O—(CH₂—CH₂O)₃]₃Si(CH₂)₃ S₂Bt, [C₁₃H₂₇O—(CH₂—CH₂O)₄]₃Si(CH₂)₃ S₂Bt, [C₁₃H₂₇O—(CH₂—CH₂O)₅]₃Si(CH₂)₃ S₂Bt, [C₁₃H₂₇O—(CH₂—CH₂O)₆]₃Si(CH₂)₃ S₂Bt, [C₁₄H₂₉O—(CH₂—CH₂O)₂]₃Si(CH₂)₃ S₂Bt, [C₁₄H₂₉O—(CH₂—CH₂O)₃]₃Si(CH₂)₃ S₂Bt, [C₁₄H₂₉O—(CH₂—CH₂O)₄]₃Si(CH₂)₃ S₂Bt, [C₁₄H₂₉O—(CH₂—CH₂O)₅]₃Si(CH₂)₃ S₂Bt, [C₁₄H₂₉O—(CH₂—CH₂O)₆]₃Si(CH₂)₃ S₂Bt, [C₁₅H₃₁O—(CH₂—CH₂O)₂]₃Si(CH₂)₃ S₂Bt, [C₁₅H₃₁O—(CH₂—CH₂O)₃]₃Si(CH₂)₃ S₂Bt, [C₁₅H₃₁O—(CH₂—CH₂O)₄]₃Si(CH₂)₃ S₂Bt, [C₁₅H₃₁O—(CH₂—CH₂O)₅]₃Si(CH₂)₃ S₂Bt, [C₁₅H₃₁O—(CH₂—CH₂O)₆]₃Si(CH₂)₃ S₂Bt, [C₁₆H₃₃O—(CH₂—CH₂O)₂]₃Si(CH₂)₃ S₂Bt, [C₁₆H₃₃O—(CH₂—CH₂O)₃]₃Si(CH₂)₃ S₂Bt, [C₁₆H₃₃O—(CH₂—CH₂O)₄]₃Si(CH₂)₃ S₂Bt, [C₁₆H₃₃O—(CH₂—CH₂O)₅]₃Si(CH₂)₃ S₂Bt, [C₁₆H₃₃O—(CH₂—CH₂O)₆]₃Si(CH₂)₃ S₂Bt, [C₁₇H₃₅O—(CH₂—CH₂O)₂]₃Si(CH₂)₃ S₂Bt, [C₁₇H₃₅O—(CH₂—CH₂O)₃]₃Si(CH₂)₃ S₂Bt, [C₁₇H₃₅O—(CH₂—CH₂O)₄]₃Si(CH₂)₃ S₂Bt, [C₁₇H₃₅O—(CH₂—CH₂O)₅]₃Si(CH₂)₃ S₂Bt, [C₁₇H₃₅O—(CH₂—CH₂O)₆]₃Si(CH₂)₃ S₂Bt,
[C₁₁H₂₃O—(CH₂—CH₂O)₂](EtO)₂Si(CH₂)₂C(CH₃)₂ S₂Bt,
[C₁₁H₂₃O—(CH₂—CH₂O)₃](EtO)₂Si(CH₂)₂C(CH₃)₂ S₂Bt,
[C₁₁H₂₃O—(CH₂—CH₂O)₄](EtO)₂Si(CH₂)₂C(CH₃)₂ S₂Bt,
[C₁₁H₂₃O—(CH₂—CH₂O)₅](EtO)₂Si(CH₂)₂C(CH₃)₂ S₂Bt,
[C₁₁H₂₃O—(CH₂—CH₂O)₆](EtO)₂Si(CH₂)₂C(CH₃)₂ S₂Bt,
[C₁₂H₂₅O—(CH₂—CH₂O)₂](EtO)₂Si(CH₂)₂C(CH₃)₂ S₂Bt,
[C₁₂H₂₅O—(CH₂—CH₂O)₃](EtO)₂Si(CH₂)₂C(CH₃)₂ S₂Bt,
[C₁₂H₂₅O—(CH₂—CH₂O)₄](EtO)₂Si(CH₂)₂C(CH₃)₂ S₂Bt,
[C₁₂H₂₅O—(CH₂—CH₂O)₅](EtO)₂Si(CH₂)₂C(CH₃)₂ S₂Bt,
[C₁₂H₂₅O—(CH₂—CH₂O)₆](EtO)₂Si(CH₂)₂C(CH₃)₂ S₂Bt,
[C₁₃H₂₇O—(CH₂—CH₂O)₂](EtO)₂Si(CH₂)₂C(CH₃)₂ S₂Bt,
[C₁₃H₂₇O—(CH₂—CH₂O)₃](EtO)₂Si(CH₂)₂C(CH₃)₂ S₂Bt,
[C₁₃H₂₇O—(CH₂—CH₂O)₄](EtO)₂Si(CH₂)₂C(CH₃)₂ S₂Bt,
[C₁₃H₂₇O—(CH₂—CH₂O)₅](EtO)₂Si(CH₂)₂C(CH₃)₂ S₂Bt,
[C₁₃H₂₇O—(CH₂—CH₂O)₆](EtO)₂Si(CH₂)₂C(CH₃)₂ S₂Bt,
[C₁₄H₂₉O—(CH₂—CH₂O)₂](EtO)₂Si(CH₂)₂C(CH₃)₂ S₂Bt,
[C₁₄H₂₉O—(CH₂—CH₂O)₃](EtO)₂Si(CH₂)₂C(CH₃)₂ S₂Bt,
[C₁₄H₂₉O—(CH₂—CH₂O)₄](EtO)₂Si(CH₂)₂C(CH₃)₂ S₂Bt,
[C₁₄H₂₉O—(CH₂—CH₂O)₅](EtO)₂Si(CH₂)₂C(CH₃)₂ S₂Bt,
[C₁₄H₂₉O—(CH₂—CH₂O)₆](EtO)₂Si(CH₂)₂C(CH₃)₂ S₂Bt,
[C₁₅H₃₁O—(CH₂—CH₂O)₂](EtO)₂Si(CH₂)₂C(CH₃)₂ S₂Bt,

[C₁₅H₃₁O—(CH₂—CH₂O)₃](EtO)₂Si(CH₂)₂C(CH₃)₂ S₂Bt,
[C₁₅H₃₁O—(CH₂—CH₂O)₄](EtO)₂Si(CH₂)₂C(CH₃)₂ S₂Bt,
[C₁₅H₃₁O—(CH₂—CH₂O)₅](EtO)₂Si(CH₂)₂C(CH₃)₂ S₂Bt,
[C₁₅H₃₁O—(CH₂—CH₂O)₆](EtO)₂Si(CH₂)₂C(CH₃)₂ S₂Bt,
[C₁₆H₃₃O—(CH₂—CH₂O)₂](EtO)₂Si(CH₂)₂C(CH₃)₂ S₂Bt,
[C₁₆H₃₃O—(CH₂—CH₂O)₃](EtO)₂Si(CH₂)₂C(CH₃)₂ S₂Bt,
[C₁₆H₃₃O—(CH₂—CH₂O)₄](EtO)₂Si(CH₂)₂C(CH₃)₂ S₂Bt,
[C₁₆H₃₃O—(CH₂—CH₂O)₅](EtO)₂Si(CH₂)₂C(CH₃)₂ S₂Bt,
[C₁₆H₃₃O—(CH₂—CH₂O)₆](EtO)₂Si(CH₂)₂C(CH₃)₂ S₂Bt,
[C₁₇H₃₅O—(CH₂—CH₂O)₂](EtO)₂Si(CH₂)₂C(CH₃)₂ S₂Bt,
[C₁₇H₃₅O—(CH₂—CH₂O)₃](EtO)₂Si(CH₂)₂C(CH₃)₂ S₂Bt,
[C₁₇H₃₅O—(CH₂—CH₂O)₄](EtO)₂Si(CH₂)₂C(CH₃)₂ S₂Bt,
[C₁₇H₃₅O—(CH₂—CH₂O)₅](EtO)₂Si(CH₂)₂C(CH₃)₂ S₂Bt,
[C₁₇H₃₅O—(CH₂—CH₂O)₆](EtO)₂Si(CH₂)₂C(CH₃)₂ S₂Bt,
[C₁₁H₂₃O—(CH₂—CH₂O)₂]₂(EtO)Si(CH₂)₂C(CH₃)₂ S₂Bt,
[C₁₁H₂₃O—(CH₂—CH₂O)₃]₂(EtO)Si(CH₂)₂C(CH₃)₂ S₂Bt,
[C₁₁H₂₃O—(CH₂—CH₂O)₄]₂(EtO)Si(CH₂)₂C(CH₃)₂ S₂Bt,
[C₁₁H₂₃O—(CH₂—CH₂O)₅]₂(EtO)Si(CH₂)₂C(CH₃)₂ S₂Bt,
[C₁₁H₂₃O—(CH₂—CH₂O)₆]₂(EtO)Si(CH₂)₂C(CH₃)₂ S₂Bt,
[C₁₂H₂₅O—(CH₂—CH₂O)₂]₂(EtO)Si(CH₂)₂C(CH₃)₂ S₂Bt,
[C₁₂H₂₅O—(CH₂—CH₂O)₃]₂(EtO)Si(CH₂)₂C(CH₃)₂ S₂Bt,
[C₁₂H₂₅O—(CH₂—CH₂O)₄]₂(EtO)Si(CH₂)₂C(CH₃)₂ S₂Bt,
[C₁₂H₂₅O—(CH₂—CH₂O)₅]₂(EtO)Si(CH₂)₂C(CH₃)₂ S₂Bt,
[C₁₂H₂₅O—(CH₂—CH₂O)₆]₂(EtO)Si(CH₂)₂C(CH₃)₂ S₂Bt
[C₁₃H₂₇O—(CH₂—CH₂O)₂]₂(EtO)Si(CH₂)₂C(CH₃)₂ S₂Bt,
[C₁₃H₂₇O—(CH₂—CH₂O)₃]₂(EtO)Si(CH₂)₂C(CH₃)₂ S₂Bt,
[C₁₃H₂₇O—(CH₂—CH₂O)₄]₂(EtO)Si(CH₂)₂C(CH₃)₂ S₂Bt,
[C₁₃H₂₇O—(CH₂—CH₂O)₅]₂(EtO)Si(CH₂)₂C(CH₃)₂ S₂Bt,
[C₁₃H₂₇O—(CH₂—CH₂O)₆]₂(EtO)Si(CH₂)₂C(CH₃)₂ S₂Bt,
[C₁₄H₂₉O—(CH₂—CH₂O)₂]₂(EtO)Si(CH₂)₂C(CH₃)₂ S₂Bt,
[C₁₄H₂₉O—(CH₂—CH₂O)₃]₂(EtO)Si(CH₂)₂C(CH₃)₂ S₂Bt,
[C₁₄H₂₉O—(CH₂—CH₂O)₄]₂(EtO)Si(CH₂)₂C(CH₃)₂ S₂Bt,
[C₁₄H₂₉O—(CH₂—CH₂O)₅]₂(EtO)Si(CH₂)₂C(CH₃)₂ S₂Bt,
[C₁₄H₂₉O—(CH₂—CH₂O)₆]₂(EtO)Si(CH₂)₂C(CH₃)₂ S₂Bt,
[C₁₅H₃₁O—(CH₂—CH₂O)₂]₂(EtO)Si(CH₂)₂C(CH₃)₂ S₂Bt,
[C₁₅H₃₁O—(CH₂—CH₂O)₃]₂(EtO)Si(CH₂)₂C(CH₃)₂ S₂Bt,
[C₁₅H₃₁O—(CH₂—CH₂O)₄]₂(EtO)Si(CH₂)₂C(CH₃)₂ S₂Bt,
[C₁₅H₃₁O—(CH₂—CH₂O)₅]₂(EtO)Si(CH₂)₂C(CH₃)₂ S₂Bt,
[C₁₅H₃₁O—(CH₂—CH₂O)₆]₂(EtO)Si(CH₂)₂C(CH₃)₂ S₂Bt,
[C₁₆H₃₃O—(CH₂—CH₂O)₂]₂(EtO)Si(CH₂)₂C(CH₃)₂ S₂Bt,
[C₁₆H₃₃O—(CH₂—CH₂O)₃]₂(EtO)Si(CH₂)₂C(CH₃)₂ S₂Bt,
[C₁₆H₃₃O—(CH₂—CH₂O)₄]₂(EtO)Si(CH₂)₂C(CH₃)₂ S₂Bt,
[C₁₆H₃₃O—(CH₂—CH₂O)₅]₂(EtO)Si(CH₂)₂C(CH₃)₂ S₂Bt,
[C₁₆H₃₃O—(CH₂—CH₂O)₆]₂(EtO)Si(CH₂)₂C(CH₃)₂ S₂Bt,
[C₁₇H₃₅O—(CH₂—CH₂O)₂]₂(EtO)Si(CH₂)₂C(CH₃)₂ S₂Bt,
[C₁₇H₃₅O—(CH₂—CH₂O)₃]₂(EtO)Si(CH₂)₂C(CH₃)₂ S₂Bt,
[C₁₇H₃₅O—(CH₂—CH₂O)₄]₂(EtO)Si(CH₂)₂C(CH₃)₂ S₂Bt,
[C₁₇H₃₅O—(CH₂—CH₂O)₅]₂(EtO)Si(CH₂)₂C(CH₃)₂ S₂Bt,
[C₁₇H₃₅O—(CH₂—CH₂O)₆]₂(EtO)Si(CH₂)₂C(CH₃)₂ S₂Bt,
[C₁₁H₂₃O—(CH₂—CH₂O)₂]₃Si(CH₂)₂C(CH₃)₂ S₂Bt,
[C₁₁H₂₃O—(CH₂—CH₂O)₃]₃Si(CH₂)₂C(CH₃)₂ S₂Bt,
[C₁₁H₂₃O—(CH₂—CH₂O)₄]₃Si(CH₂)₂C(CH₃)₂ S₂Bt,
[C₁₁H₂₃O—(CH₂—CH₂O)₅]₃Si(CH₂)₂C(CH₃)₂ S₂Bt,
[C₁₁H₂₃O—(CH₂—CH₂O)₆]₃Si(CH₂)₂C(CH₃)₂ S₂Bt,
[C₁₂H₂₅O—(CH₂—CH₂O)₂]₃Si(CH₂)₂C(CH₃)₂ S₂Bt,
[C₁₂H₂₅O—(CH₂—CH₂O)₃]₃Si(CH₂)₂C(CH₃)₂ S₂Bt,
[C₁₂H₂₅O—(CH₂—CH₂O)₄]₃Si(CH₂)₂C(CH₃)₂ S₂Bt,
[C₁₂H₂₅O—(CH₂—CH₂O)₅]₃Si(CH₂)₂C(CH₃)₂ S₂Bt,
[C₁₂H₂₅O—(CH₂—CH₂O)₆]₃Si(CH₂)₂C(CH₃)₂ S₂Bt,
[C₁₃H₂₇O—(CH₂—CH₂O)₂]₃Si(CH₂)₂C(CH₃)₂ S₂Bt,
[C₁₃H₂₇O—(CH₂—CH₂O)₃]₃Si(CH₂)₂C(CH₃)₂ S₂Bt,
[C₁₃H₂₇O—(CH₂—CH₂O)₄]₃Si(CH₂)₂C(CH₃)₂ S₂Bt,
[C₁₃H₂₇O—(CH₂—CH₂O)₅]₃Si(CH₂)₂C(CH₃)₂ S₂Bt,
[C₁₃H₂₇O—(CH₂—CH₂O)₆]₃Si(CH₂)₂C(CH₃)₂ S₂Bt,
[C₁₄H₂₉O—(CH₂—CH₂O)₂]₃Si(CH₂)₂C(CH₃)₂ S₂Bt,
[C₁₄H₂₉O—(CH₂—CH₂O)₃]₃Si(CH₂)₂C(CH₃)₂ S₂Bt,
[C₁₄H₂₉O—(CH₂—CH₂O)₄]₃Si(CH₂)₂C(CH₃)₂ S₂Bt,
[C₁₄H₂₉O—(CH₂—CH₂O)₅]₃Si(CH₂)₂C(CH₃)₂ S₂Bt,
[C₁₄H₂₉O—(CH₂—CH₂O)₆]₃Si(CH₂)₂C(CH₃)₂ S₂Bt,
[C₁₅H₃₁O—(CH₂—CH₂O)₂]₃Si(CH₂)₂C(CH₃)₂ S₂Bt,
[C₁₅H₃₁O—(CH₂—CH₂O)₃]₃Si(CH₂)₂C(CH₃)₂ S₂Bt,
[C₁₅H₃₁O—(CH₂—CH₂O)₄]₃Si(CH₂)₂C(CH₃)₂ S₂Bt,
[C₁₅H₃₁O—(CH₂—CH₂O)₅]₃Si(CH₂)₂C(CH₃)₂ S₂Bt,
[C₁₅H₃₁O—(CH₂—CH₂O)₆]₃Si(CH₂)₂C(CH₃)₂ S₂Bt,
[C₁₆H₃₃O—(CH₂—CH₂O)₂]₃Si(CH₂)₂C(CH₃)₂ S₂Bt,
[C₁₆H₃₃O—(CH₂—CH₂O)₃]₃Si(CH₂)₂C(CH₃)₂ S₂Bt,
[C₁₆H₃₃O—(CH₂—CH₂O)₄]₃Si(CH₂)₂C(CH₃)₂ S₂Bt,
[C₁₆H₃₃O—(CH₂—CH₂O)₅]₃Si(CH₂)₂C(CH₃)₂ S₂Bt,
[C₁₆H₃₃O—(CH₂—CH₂O)₆]₃Si(CH₂)₂C(CH₃)₂ S₂Bt,
[C₁₇H₃₅O—(CH₂—CH₂O)₂]₃Si(CH₂)₂C(CH₃)₂ S₂Bt,
[C₁₇H₃₅O—(CH₂—CH₂O)₃]₃Si(CH₂)₂C(CH₃)₂ S₂Bt,
[C₁₇H₃₅O—(CH₂—CH₂O)₄]₃Si(CH₂)₂C(CH₃)₂ S₂Bt,
[C₁₇H₃₅O—(CH₂—CH₂O)₅]₃Si(CH₂)₂C(CH₃)₂ S₂Bt,
[C₁₇H₃₅O—(CH₂—CH₂O)₆]₃Si(CH₂)₂C(CH₃)₂ S₂Bt,
[C₁₁H₂₃O—(CH₂—CH₂O)₂](EtO)₂Si(CH₂)₃ S₃Bt,
[C₁₁H₂₃O—(CH₂—CH₂O)₃](EtO)₂Si(CH₂)₃ S₃Bt,
[C₁₁H₂₃O—(CH₂—CH₂O)₄](EtO)₂Si(CH₂)₃ S₃Bt,
[C₁₁H₂₃O—(CH₂—CH₂O)₅](EtO)₂Si(CH₂)₃ S₃Bt,
[C₁₁H₂₃O—(CH₂—CH₂O)₆](EtO)₂Si(CH₂)₃ S₃Bt,
[C₁₂H₂₅O—(CH₂—CH₂O)₂](EtO)₂Si(CH₂)₃ S₃Bt,
[C₁₂H₂₅O—(CH₂—CH₂O)₃](EtO)₂Si(CH₂)₃ S₃Bt,
[C₁₂H₂₅O—(CH₂—CH₂O)₄](EtO)₂Si(CH₂)₃ S₃Bt,
[C₁₂H₂₅O—(CH₂—CH₂O)₅](EtO)₂Si(CH₂)₃ S₃Bt,
[C₁₂H₂₅O—(CH₂—CH₂O)₆](EtO)₂Si(CH₂)₃ S₃Bt,
[C₁₃H₂₇O—(CH₂—CH₂O)₂](EtO)₂Si(CH₂)₃ S₃Bt,
[C₁₃H₂₇O—(CH₂—CH₂O)₃](EtO)₂Si(CH₂)₃ S₃Bt,
[C₁₃H₂₇O—(CH₂—CH₂O)₄](EtO)₂Si(CH₂)₃ S₃Bt,
[C₁₃H₂₇O—(CH₂—CH₂O)₅](EtO)₂Si(CH₂)₃ S₃Bt,
[C₁₃H₂₇O—(CH₂—CH₂O)₆](EtO)₂Si(CH₂)₃ S₃Bt,
[C₁₄H₂₉O—(CH₂—CH₂O)₂](EtO)₂Si(CH₂)₃ S₃Bt,
[C₁₄H₂₉O—(CH₂—CH₂O)₃](EtO)₂Si(CH₂)₃ S₃Bt,
[C₁₄H₂₉O—(CH₂—CH₂O)₄](EtO)₂Si(CH₂)₃ S₃Bt,
[C₁₄H₂₉O—(CH₂—CH₂O)₅](EtO)₂Si(CH₂)₃ S₃Bt,
[C₁₄H₂₉O—(CH₂—CH₂O)₆](EtO)₂Si(CH₂)₃ S₃Bt,
[C₁₅H₃₁O—(CH₂—CH₂O)₂](EtO)₂Si(CH₂)₃ S₃Bt,
[C₁₅H₃₁O—(CH₂—CH₂O)₃](EtO)₂Si(CH₂)₃ S₃Bt,
[C₁₅H₃₁O—(CH₂—CH₂O)₄](EtO)₂Si(CH₂)₃ S₃Bt,
[C₁₅H₃₁O—(CH₂—CH₂O)₅](EtO)₂Si(CH₂)₃ S₃Bt,
[C₁₅H₃₁O—(CH₂—CH₂O)₆](EtO)₂Si(CH₂)₃ S₃Bt,
[C₁₆H₃₃O—(CH₂—CH₂O)₂](EtO)₂Si(CH₂)₃ S₃Bt,
[C₁₆H₃₃O—(CH₂—CH₂O)₃](EtO)₂Si(CH₂)₃ S₃Bt,
[C₁₆H₃₃O—(CH₂—CH₂O)₄](EtO)₂Si(CH₂)₃ S₃Bt,
[C₁₆H₃₃O—(CH₂—CH₂O)₅](EtO)₂Si(CH₂)₃ S₃Bt,
[C₁₆H₃₃O—(CH₂—CH₂O)₆](EtO)₂Si(CH₂)₃ S₃Bt,
[C₁₇H₃₅O—(CH₂—CH₂O)₂](EtO)₂Si(CH₂)₃ S₃Bt,
[C₁₇H₃₅O—(CH₂—CH₂O)₃](EtO)₂Si(CH₂)₃ S₃Bt,
[C₁₇H₃₅O—(CH₂—CH₂O)₄](EtO)₂Si(CH₂)₃ S₃Bt,
[C₁₇H₃₅O—(CH₂—CH₂O)₅](EtO)₂Si(CH₂)₃ S₃Bt,
[C₁₇H₃₅O—(CH₂—CH₂O)₆](EtO)₂Si(CH₂)₃ S₃Bt,
[C₁₁H₂₃O—(CH₂—CH₂O)₂]₂(EtO)Si(CH₂)₃ S₃Bt,
[C₁₁H₂₃O—(CH₂—CH₂O)₃]₂(EtO)Si(CH₂)₃ S₃Bt,
[C₁₁H₂₃O—(CH₂—CH₂O)₄]₂(EtO)Si(CH₂)₃ S₃Bt,
[C₁₁H₂₃O—(CH₂—CH₂O)₅]₂(EtO)Si(CH₂)₃ S₃Bt,
[C₁₁H₂₃O—(CH₂—CH₂O)₆]₂(EtO)Si(CH₂)₃ S₃Bt,
[C₁₂H₂₅O—(CH₂—CH₂O)₂]₂(EtO)Si(CH₂)₃ S₃Bt,
[C₁₂H₂₅O—(CH₂—CH₂O)₃]₂(EtO)Si(CH₂)₃ S₃Bt,
[C₁₂H₂₅O—(CH₂—CH₂O)₄]₂(EtO)Si(CH₂)₃ S₃Bt,
[C₁₂H₂₅O—(CH₂—CH₂O)₅]₂(EtO)Si(CH₂)₃ S₃Bt,
[C₁₂H₂₅O—(CH₂—CH₂O)₆]₂(EtO)Si(CH₂)₃ S₃Bt,
[C₁₃H₂₇O—(CH₂—CH₂O)₂]₂(EtO)Si(CH₂)₃ S₃Bt,
[C₁₃H₂₇O—(CH₂—CH₂O)₃]₂(EtO)Si(CH₂)₃ S₃Bt,
[C₁₃H₂₇O—(CH₂—CH₂O)₄]₂(EtO)Si(CH₂)₃ S₃Bt,
[C₁₃H₂₇O—(CH₂—CH₂O)₅]₂(EtO)Si(CH₂)₃ S₃Bt,
[C₁₃H₂₇O—(CH₂—CH₂O)₆]₂(EtO)Si(CH₂)₃ S₃Bt,

[C₁₄H₂₉O—(CH₂—CH₂O)₂]₂(EtO)Si(CH₂)₃ S₃Bt,
[C₁₄H₂₉O—(CH₂—CH₂O)₃]₂(EtO)Si(CH₂)₃ S₃Bt,
[C₁₄H₂₉O—(CH₂—CH₂O)₄]₂(EtO)Si(CH₂)₃ S₃Bt,
[C₁₄H₂₉O—(CH₂—CH₂O)₅]₂(EtO)Si(CH₂)₃ S₃Bt,
[C₁₄H₂₉O—(CH₂—CH₂O)₆]₂(EtO)Si(CH₂)₃ S₃Bt,
[C₁₅H₃₁O—(CH₂—CH₂O)₂]₂(EtO)Si(CH₂)₃ S₃Bt,
[C₁₅H₃₁O—(CH₂—CH₂O)₃]₂(EtO)Si(CH₂)₃ S₃Bt,
[C₁₅H₃₁O—(CH₂—CH₂O)₄]₂(EtO)Si(CH₂)₃ S₃Bt,
[C₁₅H₃₁O—(CH₂—CH₂O)₅]₂(EtO)Si(CH₂)₃ S₃Bt,
[C₁₅H₃₁O—(CH₂—CH₂O)₆]₂(EtO)Si(CH₂)₃ S₃Bt,
[C₁₆H₃₃O—(CH₂—CH₂O)₂]₂(EtO)Si(CH₂)₃ S₃Bt,
[C₁₆H₃₃O—(CH₂—CH₂O)₃]₂(EtO)Si(CH₂)₃ S₃Bt,
[C₁₆H₃₃O—(CH₂—CH₂O)₄]₂(EtO)Si(CH₂)₃ S₃Bt,
[C₁₆H₃₃O—(CH₂—CH₂O)₅]₂(EtO)Si(CH₂)₃ S₃Bt,
[C₁₆H₃₃O—(CH₂—CH₂O)₆]₂(EtO)Si(CH₂)₃ S₃Bt,
[C₁₇H₃₅O—(CH₂—CH₂O)₂]₂(EtO)Si(CH₂)₃ S₃Bt,
[C₁₇H₃₅O—(CH₂—CH₂O)₃]₂(EtO)Si(CH₂)₃ S₃Bt,
[C₁₇H₃₅O—(CH₂—CH₂O)₄]₂(EtO)Si(CH₂)₃ S₃Bt,
[C₁₇H₃₅O—(CH₂—CH₂O)₅]₂(EtO)Si(CH₂)₃ S₃Bt,
[C₁₇H₃₅O—(CH₂—CH₂O)₆]₂(EtO)Si(CH₂)₃ S₃Bt,
[C₁₁H₂₃O—(CH₂ CH₂O)₂]₃Si(CH₂)₃ S₃Bt, [C₁₁H₂₃O—(CH₂—CH₂O)₃]₃Si(CH₂)₃ S₃Bt, [C₁₁H₂₃O—(CH₂—CH₂O)₄]₃Si(CH₂)₃ S₃Bt, [C₁₁H₂₃O—(CH₂—CH₂O)₅]₃Si(CH₂)₃ S₃Bt, [C₁₁H₂₃O—(CH₂—CH₂O)₆]₃Si(CH₂)₃ S₃Bt, [C₁₂H₂₅O—(CH₂—CH₂O)₂]₃Si(CH₂)₃ S₃Bt, [C₁₂H₂₅O—(CH₂—CH₂O)₃]₃Si(CH₂)₃ S₃Bt, [C₁₂H₂₅O—(CH₂—CH₂O)₄]₃Si(CH₂)₃ S₃Bt, [C₁₂H₂₅O—(CH₂—CH₂O)₅]₃Si(CH₂)₃ S₃Bt, [C₁₂H₂₅O—(CH₂—CH₂O)₆]₃Si(CH₂)₃ S₃Bt, [C₁₃H₂₇O—(CH₂—CH₂O)₂]₃Si(CH₂)₃ S₃Bt, [C₁₃H₂₇O—(CH₂—CH₂O)₃]₃Si(CH₂)₃ S₃Bt, [C₁₃H₂₇O—(CH₂—CH₂O)₄]₃Si(CH₂)₃ S₃Bt, [C₁₃H₂₇O—(CH₂—CH₂O)₅]₃Si(CH₂)₃ S₃Bt, [C₁₃H₂₇O—(CH₂—CH₂O)₆]₃Si(CH₂)₃ S₃Bt, [C₁₄H₂₉O—(CH₂—CH₂O)₂]₃Si(CH₂)₃ S₃Bt, [C₁₄H₂₉O—(CH₂—CH₂O)₃]₃Si(CH₂)₃ S₃Bt, [C₁₄H₂₉O—(CH₂—CH₂O)₄]₃Si(CH₂)₃ S₃Bt, [C₁₄H₂₉O—(CH₂—CH₂O)₅]₃Si(CH₂)₃ S₃Bt, [C₁₄H₂₉O—(CH₂—CH₂O)₆]₃Si(CH₂)₃ S₃Bt, [C₁₅H₃₁O—(CH₂—CH₂O)₂]₃Si(CH₂)₃ S₃Bt, [C₁₅H₃₁O—(CH₂—CH₂O)₃]₃Si(CH₂)₃ S₃Bt, [C₁₅H₃₁O—(CH₂—CH₂O)₄]₃Si(CH₂)₃ S₃Bt, [C₁₅H₃₁O—(CH₂—CH₂O)₅]₃Si(CH₂)₃ S₃Bt, [C₁₅H₃₁O—(CH₂—CH₂O)₆]₃Si(CH₂)₃ S₃Bt, [C₁₆H₃₃O—(CH₂—CH₂O)₂]₃Si(CH₂)₃ S₃Bt, [C₁₆H₃₃O—(CH₂—CH₂O)₃]₃Si(CH₂)₃ S₃Bt, [C₁₆H₃₃O—(CH₂—CH₂O)₄]₃Si(CH₂)₃ S₃Bt, [C₁₆H₃₃O—(CH₂—CH₂O)₅]₃Si(CH₂)₃ S₂Bt, [C₁₆H₃₃O—(CH₂—CH₂O)₆]₃Si(CH₂)₃ S₃Bt, [C₁₇H₃₅O—(CH₂—CH₂O)₂]₃Si(CH₂)₃ S₃Bt, [C₁₇H₃₅O—(CH₂—CH₂O)₃]₃Si(CH₂)₃ S₃Bt, [C₁₇H₃₅O—(CH₂—CH₂O)₄]₃Si(CH₂)₃ S₃Bt, [C₁₇H₃₅O—(CH₂—CH₂O)₅]₃Si(CH₂)₃ S₃Bt, [C₁₇H₃₅O—(CH₂—CH₂O)₆]₃Si(CH₂)₃ S₃Bt,
C₁₁H₂₃O—(CH₂—CH₂O)₂](EtO)₂Si(CH₂)₂C(CH₃)₂ S₃Bt,
C₁₁H₂₃O—(CH₂—CH₂O)₃](EtO)₂Si(CH₂)₂C(CH₃)₂ S₃Bt,
C₁₁H₂₃O—(CH₂—CH₂O)₄] EtO)₂Si(CH₂)₂C(CH₃)₂ S₃Bt,
C₁₁H₂₃O—(CH₂—CH₂O)₅] EtO)₂Si(CH₂)₂C(CH₃)₂ S₃Bt,
C₁₁H₂₃O—(CH₂—CH₂O)₆] EtO)₂Si(CH₂)₂C(CH₃)₂ S₃Bt,
C₁₂H₂₅O—(CH₂—CH₂O)₂](EtO)₂Si(CH₂)₂C(CH₃)₂ S₃Bt,
C₁₂H₂₅O—(CH₂—CH₂O)₃](EtO)₂Si(CH₂)₂C(CH₃)₂ S₃Bt,
C₁₂H₂₅O—(CH₂—CH₂O)₄](EtO)₂Si(CH₂)₂C(CH₃)₂ S₃Bt,
C₁₂H₂₅O—(CH₂—CH₂O)₅](EtO)₂Si(CH₂)₂C(CH₃)₂ S₃Bt,
C₁₂H₂₅O—(CH₂—CH₂O)₆](EtO)₂Si(CH₂)₂C(CH₃)₂ S₃Bt,
C₁₃H₂₇O—(CH₂—CH₂O)₂](EtO)₂Si(CH₂)₂C(CH₃)₂ S₃Bt,
C₁₃H₂₇O—(CH₂—CH₂O)₃](EtO)₂Si(CH₂)₂C(CH₃)₂ S₃Bt,
C₁₃H₂₇O—(CH₂—CH₂O)₄](EtO)₂Si(CH₂)₂C(CH₃)₂ S₃Bt,
C₁₃H₂₇O—(CH₂—CH₂O)₅](EtO)₂Si(CH₂)₂C(CH₃)₂ S₃Bt,
C₁₃H₂₇O—(CH₂—CH₂O)₆](EtO)₂Si(CH₂)₂C(CH₃)₂ S₃Bt,
C₁₄H₂₉O—(CH₂—CH₂O)₂](EtO)₂Si(CH₂)₂C(CH₃)₂ S₃Bt,
C₁₄H₂₉O—(CH₂—CH₂O)₃](EtO)₂Si(CH₂)₂C(CH₃)₂ S₃Bt,
C₁₄H₂₉O—(CH₂—CH₂O)₄](EtO)₂Si(CH₂)₂C(CH₃)₂ S₃Bt,
C₁₄H₂₉O—(CH₂—CH₂O)₅](EtO)₂Si CH₂)₂C(CH₃)₂ S₃Bt,
[C₁₄H₂₉O—(CH₂—CH₂O)₆](EtO)₂Si CH₂)₂C(CH₃)₂ S₃Bt,
[C₁₅H₃₁O—(CH₂—CH₂O)₂] (EtO)₂Si(CH₂)₂C(CH₃)₂ S₃Bt,
[C₁₅H₃₁O—(CH₂—CH₂O)₃] (EtO)₂Si(CH₂)₂C(CH₃)₂ S₃Bt,
[C₁₅H₃₁O—(CH₂—CH₂O)₄] (EtO)₂Si(CH₂)₂C(CH₃)₂ S₃Bt,
[C₁₅H₃₁O—(CH₂—CH₂O)₅] (EtO)₂Si(CH₂)₂C(CH₃)₂ S₃Bt,
[C₁₅H₃₁O—(CH₂—CH₂O)₆] (EtO)₂Si(CH₂)₂C(CH₃)₂ S₃Bt,
[C₁₆H₃₃O—(CH₂—CH₂O)₂](EtO)₂Si(CH₂)₂C(CH₃)₂ S₃Bt,
[C₁₆H₃₃O—(CH₂—CH₂O)₃](EtO)₂Si(CH₂)₂C(CH₃)₂ S₃Bt,
[C₁₆H₃₃O—(CH₂—CH₂O)₄](EtO)₂Si(CH₂)₂C(CH₃)₂ S₃Bt,
[C₁₆H₃₃O—(CH₂—CH₂O)₅](EtO)₂Si(CH₂)₂C(CH₃)₂ S₃Bt,
[C₁₆H₃₃O—(CH₂—CH₂O)₆](EtO)₂Si(CH₂)₂C(CH₃)₂ S₃Bt,
[C₁₇H₃₅O—(CH₂—CH₂O)₂] (EtO)₂Si(CH₂)₂C(CH₃)₂ S₃Bt,
[C₁₇H₃₅O—(CH₂—CH₂O)₃](EtO)₂Si(CH₂)₂C(CH₃)₂ S₃Bt,
[C₁₇H₃₅O—(CH₂—CH₂O)₄](EtO)₂Si(CH₂)₂C(CH₃)₂ S₃Bt,
[C₁₇H₃₅O—(CH₂—CH₂O)₅](EtO)₂Si(CH₂)₂C(CH₃)₂ S₃Bt,
[C₁₇H₃₅O—(CH₂—CH₂O)₆](EtO)₂Si(CH₂)₂C(CH₃)₂ S₃Bt,
[C₁₁H₂₃O—(CH₂—CH₂O)₂]₂(EtO)Si(CH₂)₂C(CH₃)₂ S₃Bt,
[C₁₁H₂₃O—(CH₂—CH₂O)₃]₂(EtO)Si(CH₂)₂C(CH₃)₂ S₃Bt,
[C₁₁H₂₃O—(CH₂—CH₂O)₄]₂(EtO)Si(CH₂)₂C(CH₃)₂ S₃Bt,
[C₁₁H₂₃O—(CH₂—CH₂O)₅]₂(EtO)Si(CH₂)₂C(CH₃)₂ S₃Bt,
[C₁₁H₂₃O—(CH₂—CH₂O)₆]₂(EtO)Si(CH₂)₂C(CH₃)₂ S₃Bt,
[C₁₂H₂₅O—(CH₂—CH₂O)₂]₂(EtO)Si(CH₂)₂C(CH₃)₂ S₃Bt,
[C₁₂H₂₅O—(CH₂—CH₂O)₃]₂(EtO)Si(CH₂)₂C(CH₃)₂ S₃Bt,
[C₁₂H₂₅O—(CH₂—CH₂O)₄]₂(EtO)Si(CH₂)₂C(CH₃)₂ S₃Bt,
[C₁₂H₂₅O—(CH₂—CH₂O)₅]₂(EtO)Si(CH₂)₂C(CH₃)₂ S₃Bt,
[C₁₂H₂₅O—(CH₂—CH₂O)₆]₂(EtO)Si(CH₂)₂C(CH₃)₂ S₃Bt,
[C₁₃H₂₇O—(CH₂—CH₂O)₂]₂(EtO)Si(CH₂)₂C(CH₃)₂ S₃Bt,
[C₁₃H₂₇O—(CH₂—CH₂O)₃]₂(EtO)Si(CH₂)₂C(CH₃)₂ S₃Bt,
[C₁₃H₂₇O—(CH₂—CH₂O)₄]₂(EtO)Si(CH₂)₂C(CH₃)₂ S₃Bt,
[C₁₃H₂₇O—(CH₂—CH₂O)₅]₂(EtO)Si(CH₂)₂C(CH₃)₂ S₃Bt,
[C₁₃H₂₇O—(CH₂—CH₂O)₆]₂(EtO)Si(CH₂)₂C(CH₃)₂ S₃Bt,
[C₁₄H₂₉O—(CH₂—CH₂O)₂]₂(EtO)Si(CH₂)₂C(CH₃)₂ S₃Bt,
[C₁₄H₂₉O—(CH₂—CH₂O)₃]₂(EtO)Si(CH₂)₂C(CH₃)₂ S₃Bt,
[C₁₄H₂₉O—(CH₂—CH₂O)₄]₂(EtO)Si(CH₂)₂C(CH₃)₂ S₃Bt,
[C₁₄H₂₉O—(CH₂—CH₂O)₅]₂(EtO)Si(CH₂)₂C(CH₃)₂ S₃Bt,
[C₁₄H₂₉O—(CH₂—CH₂O)₆]₂(EtO)Si(CH₂)₂C(CH₃)₂ S₃Bt,
[C₁₅H₃₁O—(CH₂—CH₂O)₂]₂(EtO)Si(CH₂)₂C(CH₃)₂ S₃Bt,
[C₁₅H₃₁O—(CH₂—CH₂O)₃]₂(EtO)Si(CH₂)₂C(CH₃)₂ S₃Bt,
[C₁₅H₃₁O—(CH₂—CH₂O)₄]₂(EtO)Si(CH₂)₂C(CH₃)₂ S₃Bt,
[C₁₅H₃₁O—(CH₂—CH₂O)₅]₂(EtO)Si(CH₂)₂C(CH₃)₂ S₃Bt,
[C₁₅H₃₁O—(CH₂—CH₂O)₆]₂(EtO)Si(CH₂)₂C(CH₃)₂ S₃Bt,
[C₁₆H₃₃O—(CH₂—CH₂O)₂]₂(EtO)Si(CH₂)₂C(CH₃)₂ S₃Bt,
[C₁₆H₃₃O—(CH₂—CH₂O)₃]₂(EtO)Si(CH₂)₂C(CH₃)₂ S₃Bt,
[C₁₆H₃₃O—(CH₂—CH₂O)₄]₂(EtO)Si(CH₂)₂C(CH₃)₂ S₃Bt,
[C₁₆H₃₃O—(CH₂—CH₂O)₅]₂(EtO)Si(CH₂)₂C(CH₃)₂ S₃Bt,
[C₁₆H₃₃O—(CH₂—CH₂O)₆]₂(EtO)Si(CH₂)₂C(CH₃)₂ S₃Bt,
[C₁₇H₃₅O—(CH₂—CH₂O)₂]₂(EtO)Si(CH₂)₂C(CH₃)₂ S₃Bt,
[C₁₇H₃₅O—(CH₂—CH₂O)₃]₂(EtO)Si(CH₂)₂C(CH₃)₂ S₃Bt,
[C₁₇H₃₅O—(CH₂—CH₂O)₄]₂(EtO)Si(CH₂)₂C(CH₃)₂ S₃Bt,
[C₁₇H₃₅O—(CH₂—CH₂O)₅]₂(EtO)Si(CH₂)₂C(CH₃)₂ S₃Bt,
[C₁₇H₃₅O—(CH₂—CH₂O)₆]₂(EtO)Si(CH₂)₂C(CH₃)₂ S₃Bt,
[C₁₁H₂₃O—(CH₂—CH₂O)₂]₃Si(CH₂)₂C(CH₃)₂ S₃Bt,
[C₁₁H₂₃O—(CH₂—CH₂O)₃]₃Si(CH₂)₂C(CH₃)₂ S₃Bt,
[C₁₁H₂₃O—(CH₂—CH₂O)₄]₃Si(CH₂)₂C(CH₃)₂ S₃Bt,
[C₁₁H₂₃O—(CH₂—CH₂O)₅]₃Si(CH₂)₂C(CH₃)₂ S₃Bt,
[C₁₁H₂₃O—(CH₂—CH₂O)₆]₃Si(CH₂)₂C(CH₃)₂ S₃Bt,
[C₁₂H₂₅O—(CH₂—CH₂O)₂]₃Si(CH₂)₂C(CH₃)₂ S₃Bt,
[C₁₂H₂₅O—(CH₂—CH₂O)₃]₃Si(CH₂)₂C(CH₃)₂ S₃Bt,
[C₁₂H₂₅O—(CH₂—CH₂O)₄]₃Si(CH₂)₂C(CH₃)₂ S₃Bt,
[C₁₂H₂₅O—(CH₂—CH₂O)₅]₃Si(CH₂)₂C(CH₃)₂ S₃Bt,
[C₁₂H₂₅O—(CH₂—CH₂O)₆]₃Si(CH₂)₂C(CH₃)₂ S₃Bt,
[C₁₃H₂₇O—(CH₂—CH₂O)₂]₃Si(CH₂)₂C(CH₃)₂ S₃Bt,
[C₁₃H₂₇O—(CH₂—CH₂O)₃]₃Si(CH₂)₂C(CH₃)₂ S₃Bt,
[C₁₃H₂₇O—(CH₂—CH₂O)₄]₃Si(CH₂)₂C(CH₃)₂ S₃Bt,
[C₁₃H₂₇O—(CH₂—CH₂O)₅]₃Si(CH₂)₂C(CH₃)₂ S₃Bt,
[C₁₃H₂₇O—(CH₂—CH₂O)₆]₃Si(CH₂)₂C(CH₃)₂ S₃Bt,
[C₁₄H₂₉O—(CH₂—CH₂O)₂]₃Si(CH₂)₂C(CH₃)₂ S₃Bt,

[C$_{14}$H$_{29}$O—(CH$_2$—CH$_2$O)$_3$]$_3$Si(CH$_2$)$_2$C(CH$_3$)$_2$ S$_3$Bt,
[C$_{14}$H$_{29}$O—(CH$_2$—CH$_2$O)$_4$]$_3$Si(CH$_2$)$_2$C(CH$_3$)$_2$ S$_3$Bt,
[C$_{14}$H$_{29}$O—(CH$_2$—CH$_2$O)$_5$]$_3$Si CH$_2$)$_2$C(CH$_3$)$_2$ S$_3$Bt,
[C$_{14}$H$_{29}$O—(CH$_2$—CH$_2$O)$_6$]$_3$Si CH$_2$)$_2$C(CH$_3$)$_2$ S$_3$Bt,
[C$_{15}$H$_{31}$O—(CH$_2$—CH$_2$O)$_2$]$_3$Si(CH$_2$)$_2$C(CH$_3$)$_2$ S$_3$Bt,
[C$_{15}$H$_{31}$O—(CH$_2$—CH$_2$O)$_3$]$_3$Si(CH$_2$)$_2$C(CH$_3$)$_2$ S$_3$Bt,
[C$_{15}$H$_{31}$O—(CH$_2$—CH$_2$O)$_4$]$_3$Si(CH$_2$)$_2$C(CH$_3$)$_2$ S$_3$Bt,
[C$_{15}$H$_{31}$O—(CH$_2$—CH$_2$O)$_5$]$_3$Si(CH$_2$)$_2$C(CH$_3$)$_2$ S$_3$Bt,
[C$_{15}$H$_{31}$O—(CH$_2$—CH$_2$O)$_6$]$_3$Si(CH$_2$)$_2$C(CH$_3$)$_2$ S$_3$Bt,
[C$_{16}$H$_{33}$O—(CH$_2$—CH$_2$O)$_2$]$_3$Si(CH$_2$)$_2$C(CH$_3$)$_2$ S$_3$Bt,
[C$_{16}$H$_{33}$O—(CH$_2$—CH$_2$O)$_3$]$_3$Si(CH$_2$)$_2$C(CH$_3$)$_2$ S$_3$Bt,
[C$_{16}$H$_{33}$O—(CH$_2$—CH$_2$O)$_4$]$_3$Si(CH$_2$)$_2$C(CH$_3$)$_2$ S$_3$Bt,
[C$_{16}$H$_{33}$O—(CH$_2$—CH$_2$O)$_5$]$_3$Si(CH$_2$)$_2$C(CH$_3$)$_2$ S$_3$Bt,
[C$_{16}$H$_{33}$O—(CH$_2$—CH$_2$O)$_6$]$_3$Si(CH$_2$)$_2$C(CH$_3$)$_2$ S$_3$Bt,
[C$_{17}$H$_{35}$O—(CH$_2$—CH$_2$O)$_2$]$_3$Si(CH$_2$)$_2$C(CH$_3$)$_2$ S$_3$Bt,
[C$_{17}$H$_{35}$O—(CH$_2$—CH$_2$O)$_3$]$_3$Si(CH$_2$)$_2$C(CH$_3$)$_2$ S$_3$Bt,
[C$_{17}$H$_{35}$O—(CH$_2$—CH$_2$O)$_4$]$_3$Si(CH$_2$)$_2$C(CH$_3$)$_2$ S$_3$Bt,
[C$_{17}$H$_{35}$O—(CH$_2$—CH$_2$O)$_5$]$_3$Si(CH$_2$)$_2$C(CH$_3$)$_2$ S$_3$Bt,
[C$_{17}$H$_{35}$O—(CH$_2$—CH$_2$O)$_6$]$_3$Si(CH$_2$)$_2$C(CH$_3$)$_2$ S$_3$Bt,
[C$_{11}$H$_{23}$O—(CH$_2$—CH$_2$O)$_2$](EtO)$_2$Si(CH$_2$)$_3$ S$_4$Bt,
[C$_{11}$H$_{23}$O—(CH$_2$—CH$_2$O)$_3$](EtO)$_2$Si(CH$_2$)$_3$ S$_4$Bt,
[C$_{11}$H$_{23}$O—(CH$_2$—CH$_2$O)$_4$](EtO)$_2$Si(CH$_2$)$_3$ S$_4$Bt,
[C$_{11}$H$_{23}$O—(CH$_2$—CH$_2$O)$_5$](EtO)$_2$Si(CH$_2$)$_3$ S$_4$Bt,
[C$_{11}$H$_{23}$O—(CH$_2$—CH$_2$O)$_6$](EtO)$_2$Si(CH$_2$)$_3$ S$_4$Bt,
[C$_{12}$H$_{25}$O—(CH$_2$—CH$_2$O)$_2$](EtO)$_2$Si(CH$_2$)$_3$ S$_4$Bt,
[C$_{12}$H$_{25}$O—(CH$_2$—CH$_2$O)$_3$](EtO)$_2$Si(CH$_2$)$_3$ S$_4$Bt,
[C$_{12}$H$_{25}$O—(CH$_2$—CH$_2$O)$_4$](EtO)$_2$Si(CH$_2$)$_3$ S$_4$Bt,
[C$_{12}$H$_{25}$O—(CH$_2$—CH$_2$O)$_5$](EtO)$_2$Si(CH$_2$)$_3$ S$_4$Bt,
[C$_{12}$H$_{25}$O—(CH$_2$—CH$_2$O)$_6$](EtO)$_2$Si(CH$_2$)$_3$ S$_4$Bt,
[C$_{13}$H$_{27}$O—(CH$_2$—CH$_2$O)$_2$](EtO)$_2$Si(CH$_2$)$_3$ S$_4$Bt,
[C$_{13}$H$_{27}$O—(CH$_2$—CH$_2$O)$_3$](EtO)$_2$Si(CH$_2$)$_3$ S$_4$Bt,
[C$_{13}$H$_{27}$O—(CH$_2$—CH$_2$O)$_4$](EtO)$_2$Si(CH$_2$)$_3$ S$_4$Bt,
[C$_{13}$H$_{27}$O—(CH$_2$—CH$_2$O)$_5$](EtO)$_2$Si(CH$_2$)$_3$ S$_4$Bt,
[C$_{13}$H$_{27}$O—(CH$_2$—CH$_2$O)$_6$](EtO)$_2$Si(CH$_2$)$_3$ S$_4$Bt,
[C$_{14}$H$_{29}$O—(CH$_2$—CH$_2$O)$_2$](EtO)$_2$Si(CH$_2$)$_3$ S$_4$Bt,
[C$_{14}$H$_{29}$O—(CH$_2$—CH$_2$O)$_3$](EtO)$_2$Si(CH$_2$)$_3$ S$_4$Bt,
[C$_{14}$H$_{29}$O—(CH$_2$—CH$_2$O)$_4$](EtO)$_2$Si(CH$_2$)$_3$ S$_4$Bt,
[C$_{14}$H$_{29}$O—(CH$_2$—CH$_2$O)$_5$](EtO)$_2$Si(CH$_2$)$_3$ S$_4$Bt,
[C$_{14}$H$_{29}$O—(CH$_2$—CH$_2$O)$_6$](EtO)$_2$Si(CH$_2$)$_3$ S$_4$Bt,
[C$_{15}$H$_{31}$O—(CH$_2$—CH$_2$O)$_2$](EtO)$_2$Si(CH$_2$)$_3$ S$_4$Bt,
[C$_{15}$H$_{31}$O—(CH$_2$—CH$_2$O)$_3$](EtO)$_2$Si(CH$_2$)$_3$ S$_4$Bt,
[C$_{15}$H$_{31}$O—(CH$_2$—CH$_2$O)$_4$](EtO)$_2$Si(CH$_2$)$_3$ S$_4$Bt,
[C$_{15}$H$_{31}$O—(CH$_2$—CH$_2$O)$_5$](EtO)$_2$Si(CH$_2$)$_3$ S$_4$Bt,
[C$_{15}$H$_{31}$O—(CH$_2$—CH$_2$O)$_6$](EtO)$_2$Si(CH$_2$)$_3$ S$_4$Bt,
[C$_{16}$H$_{33}$O—(CH$_2$—CH$_2$O)$_2$](EtO)$_2$Si(CH$_2$)$_3$ S$_4$Bt,
[C$_{16}$H$_{33}$O—(CH$_2$—CH$_2$O)$_3$](EtO)$_2$Si(CH$_2$)$_3$ S$_4$Bt,
[C$_{16}$H$_{33}$O—(CH$_2$—CH$_2$O)$_4$](EtO)$_2$Si(CH$_2$)$_3$ S$_4$Bt,
[C$_{16}$H$_{33}$O—(CH$_2$—CH$_2$O)$_5$](EtO)$_2$Si(CH$_2$)$_3$ S$_4$Bt,
[C$_{16}$H$_{33}$O—(CH$_2$—CH$_2$O)$_6$](EtO)$_2$Si(CH$_2$)$_3$ S$_4$Bt,
[C$_{17}$H$_{35}$O—(CH$_2$—CH$_2$O)$_2$](EtO)$_2$Si(CH$_2$)$_3$ S$_4$Bt,
[C$_{17}$H$_{35}$O—(CH$_2$—CH$_2$O)$_3$](EtO)$_2$Si(CH$_2$)$_3$ S$_4$Bt,
[C$_{17}$H$_{35}$O—(CH$_2$—CH$_2$O)$_4$](EtO)$_2$Si(CH$_2$)$_3$ S$_4$Bt,
[C$_{17}$H$_{35}$O—(CH$_2$—CH$_2$O)$_5$](EtO)$_2$Si(CH$_2$)$_3$ S$_4$Bt,
[C$_{17}$H$_{35}$O—(CH$_2$—CH$_2$O)$_6$](EtO)$_2$Si(CH$_2$)$_3$ S$_4$Bt,
[C$_{11}$H$_{23}$O—(CH$_2$—CH$_2$O)$_2$]$_2$(EtO)Si(CH$_2$)$_3$ S$_4$Bt,
[C$_{11}$H$_{23}$O—(CH$_2$—CH$_2$O)$_3$]$_2$(EtO)Si(CH$_2$)$_3$ S$_4$Bt,
[C$_{11}$H$_{23}$O—(CH$_2$—CH$_2$O)$_4$]$_2$(EtO)Si(CH$_2$)$_3$ S$_4$Bt,
[C$_{11}$H$_{23}$O—(CH$_2$—CH$_2$O)$_5$]$_2$(EtO)Si(CH$_2$)$_3$ S$_4$Bt,
[C$_{11}$H$_{23}$O—(CH$_2$—CH$_2$O)$_6$]$_2$(EtO)Si(CH$_2$)$_3$ S$_4$Bt,
[C$_{12}$H$_{25}$O—(CH$_2$—CH$_2$O)$_2$]$_2$(EtO)Si(CH$_2$)$_3$ S$_4$Bt,
[C$_{12}$H$_{25}$O—(CH$_2$—CH$_2$O)$_3$]$_2$(EtO)Si(CH$_2$)$_3$ S$_4$Bt,
[C$_{12}$H$_{25}$O—(CH$_2$—CH$_2$O)$_4$]$_2$(EtO)Si(CH$_2$)$_3$ S$_4$Bt,
[C$_{12}$H$_{25}$O—(CH$_2$—CH$_2$O)$_5$]$_2$(EtO)Si(CH$_2$)$_3$ S$_4$Bt,
[C$_{12}$H$_{25}$O—(CH$_2$—CH$_2$O)$_6$]$_2$(EtO)Si(CH$_2$)$_3$ S$_4$Bt,
[C$_{13}$H$_{27}$O—(CH$_2$—CH$_2$O)$_2$]$_2$(EtO)Si(CH$_2$)$_3$ S$_4$Bt,
[C$_{13}$H$_{27}$O—(CH$_2$—CH$_2$O)$_3$]$_2$(EtO)Si(CH$_2$)$_3$ S$_4$Bt,
[C$_{13}$H$_{27}$O—(CH$_2$—CH$_2$O)$_4$]$_2$(EtO)Si(CH$_2$)$_3$ S$_4$Bt,
[C$_{13}$H$_{27}$O—(CH$_2$—CH$_2$O)$_5$]$_2$(EtO)Si(CH$_2$)$_3$ S$_4$Bt,
[C$_{13}$H$_{27}$O—(CH$_2$—CH$_2$O)$_6$]$_2$(EtO)Si(CH$_2$)$_3$ S$_4$Bt,
[C$_{14}$H$_{29}$O—(CH$_2$—CH$_2$O)$_2$]$_2$(EtO)Si(CH$_2$)$_3$ S$_4$Bt,
[C$_{14}$H$_{29}$O—(CH$_2$—CH$_2$O)$_3$]$_2$(EtO)Si(CH$_2$)$_3$ S$_4$Bt,
[C$_{14}$H$_{29}$O—(CH$_2$—CH$_2$O)$_4$]$_2$(EtO)Si(CH$_2$)$_3$ S$_4$Bt,
[C$_{14}$H$_{29}$O—(CH$_2$—CH$_2$O)$_5$]$_2$(EtO)Si(CH$_2$)$_3$ S$_4$Bt,
[C$_{14}$H$_{29}$O—(CH$_2$—CH$_2$O)$_6$]$_2$(EtO)Si(CH$_2$)$_3$ S$_4$Bt,
[C$_{15}$H$_{31}$O—(CH$_2$—CH$_2$O)$_2$]$_2$(EtO)Si(CH$_2$)$_3$ S$_4$Bt,
[C$_{15}$H$_{31}$O—(CH$_2$—CH$_2$O)$_3$]$_2$(EtO)Si(CH$_2$)$_3$ S$_4$Bt,
[C$_{15}$H$_{31}$O—(CH$_2$—CH$_2$O)$_4$]$_2$(EtO)Si(CH$_2$)$_3$ S$_4$Bt,
[C$_{15}$H$_{31}$O—(CH$_2$—CH$_2$O)$_5$]$_2$(EtO)Si(CH$_2$)$_3$ S$_4$Bt,
[C$_{15}$H$_{31}$O—(CH$_2$—CH$_2$O)$_6$]$_2$(EtO)Si(CH$_2$)$_3$ S$_4$Bt,
[C$_{16}$H$_{33}$O—(CH$_2$—CH$_2$O)$_2$]$_2$(EtO)Si(CH$_2$)$_3$ S$_4$Bt,
[C$_{16}$H$_{33}$O—(CH$_2$—CH$_2$O)$_3$]$_2$(EtO)Si(CH$_2$)$_3$ S$_4$Bt,
[C$_{16}$H$_{33}$O—(CH$_2$—CH$_2$O)$_4$]$_2$(EtO)Si(CH$_2$)$_3$ S$_4$Bt,
[C$_{16}$H$_{33}$O—(CH$_2$—CH$_2$O)$_5$]$_2$(EtO)Si(CH$_2$)$_3$ S$_4$Bt,
[C$_{16}$H$_{33}$O—(CH$_2$—CH$_2$O)$_6$]$_2$(EtO)Si(CH$_2$)$_3$ S$_4$Bt,
[C$_{17}$H$_{35}$O—(CH$_2$—CH$_2$O)$_2$]$_2$(EtO)Si(CH$_2$)$_3$ S$_4$Bt,
[C$_{17}$H$_{35}$O—(CH$_2$—CH$_2$O)$_3$]$_2$(EtO)Si(CH$_2$)$_3$ S$_4$Bt,
[C$_{17}$H$_{35}$O—(CH$_2$—CH$_2$O)$_4$]$_2$(EtO)Si(CH$_2$)$_3$ S$_4$Bt,
[C$_{17}$H$_{35}$O—(CH$_2$—CH$_2$O)$_5$]$_2$(EtO)Si(CH$_2$)$_3$ S$_4$Bt,
[C$_{17}$H$_{35}$O—(CH$_2$—CH$_2$O)$_6$]$_2$(EtO)Si(CH$_2$)$_3$ S$_4$Bt,
[C$_{11}$H$_{23}$O—(CH$_2$—CH$_2$O)$_2$]$_3$Si(CH$_2$)$_3$ S$_4$Bt, [C$_{11}$H$_{23}$O—(CH$_2$—CH$_2$O)$_3$]$_3$Si(CH$_2$)$_3$ S$_4$Bt, [C$_{11}$H$_{23}$O—(CH$_2$—CH$_2$O)$_4$]$_3$Si(CH$_2$)$_3$ S$_4$Bt, [C$_{11}$H$_{23}$O—(CH$_2$—CH$_2$O)$_5$]$_3$Si(CH$_2$)$_3$ S$_4$Bt, [C$_{11}$H$_{23}$O—(CH$_2$—CH$_2$O)$_6$]$_3$Si(CH$_2$)$_3$ S$_4$Bt, [C$_{12}$H$_{25}$O—(CH$_2$—CH$_2$O)$_2$]$_3$Si(CH$_2$)$_3$ S$_4$Bt, [C$_{12}$H$_{25}$O—(CH$_2$—CH$_2$O)$_3$]$_3$Si(CH$_2$)$_3$ S$_4$Bt, [C$_{12}$H$_{25}$O—(CH$_2$—CH$_2$O)$_4$]$_3$Si(CH$_2$)$_3$ S$_4$Bt, [C$_{12}$H$_{25}$O—(CH$_2$—CH$_2$O)$_5$]$_3$Si(CH$_2$)$_3$ S$_4$Bt, [C$_{12}$H$_{25}$O—(CH$_2$—CH$_2$O)$_6$]$_3$Si(CH$_2$)$_3$ S$_4$Bt, [C$_{13}$H$_{27}$O—(CH$_2$—CH$_2$O)$_2$]$_3$Si(CH$_2$)$_3$ S$_4$Bt, [C$_{13}$H$_{27}$O—(CH$_2$—CH$_2$O)$_3$]$_3$Si(CH$_2$)$_3$ S$_4$Bt, [C$_{13}$H$_{27}$O—(CH$_2$—CH$_2$O)$_4$]$_3$Si(CH$_2$)$_3$ S$_4$Bt, [C$_{13}$H$_{27}$O—(CH$_2$—CH$_2$O)$_5$]$_3$Si(CH$_2$)$_3$ S$_4$Bt, [C$_{13}$H$_{27}$O—(CH$_2$—CH$_2$O)$_6$]$_3$Si(CH$_2$)$_3$ S$_4$Bt, [C$_{14}$H$_{29}$O—(CH$_2$—CH$_2$O)$_2$]$_3$Si(CH$_2$)$_3$ S$_4$Bt, [C$_{14}$H$_{29}$O—(CH$_2$—CH$_2$O)$_3$]$_3$Si(CH$_2$)$_3$ S$_4$Bt, [C$_{14}$H$_{29}$O—(CH$_2$—CH$_2$O)$_4$]$_3$Si(CH$_2$)$_3$ S$_4$Bt, [C$_{14}$H$_{29}$O—(CH$_2$—CH$_2$O)$_5$]$_3$Si(CH$_2$)$_3$ S$_4$Bt, [C$_{14}$H$_{29}$O—(CH$_2$—CH$_2$O)$_6$]$_3$Si(CH$_2$)$_3$ S$_4$Bt, [C$_{15}$H$_{31}$O—(CH$_2$—CH$_2$O)$_2$]$_3$Si(CH$_2$)$_3$ S$_4$Bt, [C$_{15}$H$_{31}$O—(CH$_2$—CH$_2$O)$_3$]$_3$Si(CH$_2$)$_3$ S$_4$Bt, [C$_{13}$H$_{31}$O—(CH$_2$—CH$_2$O)$_4$]$_3$Si(CH$_2$)$_3$ S$_4$Bt, [C$_{13}$H$_{31}$O—(CH$_2$—CH$_2$O)$_5$]$_3$Si(CH$_2$)$_3$ S$_4$Bt, [C$_{15}$H$_{31}$O—(CH$_2$—CH$_2$O)$_6$]$_3$Si(CH$_2$)$_3$ S$_4$Bt, [C$_{16}$H$_{33}$O—(CH$_2$—CH$_2$O)$_2$]$_3$Si(CH$_2$)$_3$ S$_4$Bt, [C$_{16}$H$_{33}$O—(CH$_2$—CH$_2$O)$_3$]$_3$Si(CH$_2$)$_3$ S$_4$Bt, [C$_{16}$H$_{33}$O—(CH$_2$—CH$_2$O)$_4$]$_3$Si(CH$_2$)$_3$ S$_4$Bt, [C$_{16}$H$_{33}$O—(CH$_2$—CH$_2$O)$_5$]$_3$Si(CH$_2$)$_3$ S$_4$Bt, [C$_{16}$H$_{33}$O—(CH$_2$—CH$_2$O)$_6$]$_3$Si(CH$_2$)$_3$ S$_4$Bt, [C$_{17}$H$_{35}$O—(CH$_2$—CH$_2$O)$_2$]$_3$Si(CH$_2$)$_3$ S$_4$Bt, [C$_{17}$H$_{35}$O—(CH$_2$—CH$_2$O)$_3$]$_3$Si(CH$_2$)$_3$ S$_4$Bt, [C$_{17}$H$_{35}$O—(CH$_2$—CH$_2$O)$_4$]$_3$Si(CH$_2$)$_3$ S$_4$Bt, [C$_{17}$H$_{35}$O—(CH$_2$—CH$_2$O)$_5$]$_3$Si(CH$_2$)$_3$ S$_4$Bt, [C$_{17}$H$_{35}$O—(CH$_2$—CH$_2$O)$_6$]$_3$Si(CH$_2$)$_3$ S$_4$Bt,
[C$_{11}$H$_{23}$O—(CH$_2$—CH$_2$O)$_2$](EtO)$_2$Si(CH$_2$)$_2$C(CH$_3$)$_2$ S$_4$Bt,
[C$_{11}$H$_{23}$O—(CH$_2$—CH$_2$O)$_3$](EtO)$_2$Si(CH$_2$)$_2$C(CH$_3$)$_2$ S$_4$Bt,
[C$_{11}$H$_{23}$O—(CH$_2$—CH$_2$O)$_4$] EtO)$_2$Si(CH$_2$)$_2$C(CH$_3$)$_2$ S$_4$Bt,
[C$_{11}$H$_{23}$O—(CH$_2$—CH$_2$O)$_5$] EtO)$_2$Si(CH$_2$)$_2$C(CH$_3$)$_2$ S$_4$Bt,
[C$_{11}$H$_{23}$O—(CH$_2$—CH$_2$O)$_6$] EtO)$_2$Si(CH$_2$)$_2$C(CH$_3$)$_2$ S$_4$Bt,
[C$_{12}$H$_{25}$O—(CH$_2$—CH$_2$O)$_2$](EtO)$_2$Si(CH$_2$)$_2$C(CH$_3$)$_2$ S$_4$Bt,
[C$_{12}$H$_{25}$O—(CH$_2$—CH$_2$O)$_3$](EtO)$_2$Si(CH$_2$)$_2$C(CH$_3$)$_2$ S$_4$Bt,
[C$_{12}$H$_{25}$O—(CH$_2$—CH$_2$O)$_4$](EtO)$_2$Si(CH$_2$)$_2$C(CH$_3$)$_2$ S$_4$Bt,
[C$_{12}$H$_{25}$O—(CH$_2$—CH$_2$O)$_5$](EtO)$_2$Si(CH$_2$)$_2$C(CH$_3$)$_2$ S$_4$Bt,
[C$_{12}$H$_{25}$O—(CH$_2$—CH$_2$O)$_6$](EtO)$_2$Si(CH$_2$)$_2$C(CH$_3$)$_2$ S$_4$Bt,
[C$_{13}$H$_{27}$O—(CH$_2$—CH$_2$O)$_2$](EtO)$_2$Si(CH$_2$)$_2$C(CH$_3$)$_2$ S$_4$Bt,
[C$_{13}$H$_{27}$O—(CH$_2$—CH$_2$O)$_3$](EtO)$_2$Si(CH$_2$)$_2$C(CH$_3$)$_2$ S$_4$Bt,
[C$_{13}$H$_{27}$O—(CH$_2$—CH$_2$O)$_4$](EtO)$_2$Si(CH$_2$)$_2$C(CH$_3$)$_2$ S$_4$Bt,
[C$_{13}$H$_{27}$O—(CH$_2$—CH$_2$O)$_5$](EtO)$_2$Si(CH$_2$)$_2$C(CH$_3$)$_2$ S$_4$Bt,
[C$_{13}$H$_{27}$O—(CH$_2$—CH$_2$O)$_6$](EtO)$_2$Si(CH$_2$)$_2$C(CH$_3$)$_2$ S$_4$Bt,
[C$_{14}$H$_{23}$O—(CH$_2$—CH$_2$O)$_2$] (EtO)$_2$Si(CH$_2$)$_2$C(CH$_3$)$_2$ S$_4$Bt,
[C$_{14}$H$_{29}$O—(CH$_2$—CH$_2$O)$_3$](EtO)$_2$Si(CH$_2$)$_2$C(CH$_3$)$_2$ S$_4$Bt,

[C₁₄H₂₉O—(CH₂—CH₂O)₄](EtO)₂Si(CH₂)₂C(CH₃)₂ S₄Bt,
[C₁₄H₂₉O—(CH₂—CH₂O)₅](EtO)₂Si CH₂)₂C(CH₃)₂ S₄Bt,
[C₁₄H₂₉O—(CH₂—CH₂O)₆](EtO)₂Si CH₂)₂C(CH₃)₂ S₄Bt,
[C₁₅H₃₁O—(CH₂—CH₂O)₂](EtO)₂Si(CH₂)₂C(CH₃)₂ S₄Bt,
[C₁₅H₃₁O—(CH₂—CH₂O)₃](EtO)₂Si(CH₂)₂C(CH₃)₂ S₄Bt,
[C₁₅H₃₁O—(CH₂—CH₂O)₄](EtO)₂Si(CH₂)₂C(CH₃)₂ S₄Bt,
[C₁₅H₃₁O—(CH₂—CH₂O)₅](EtO)₂Si(CH₂)₂C(CH₃)₂ S₄Bt,
[C₁₅H₃₁O—(CH₂—CH₂O)₆](EtO)₂Si(CH₂)₂C(CH₃)₂ S₄Bt,
[C₁₆H₃₃O—(CH₂—CH₂O)₂](EtO)₂Si(CH₂)₂C(CH₃)₂ S₄Bt,
[C₁₆H₃₃O—(CH₂—CH₂O)₃](EtO)₂Si(CH₂)₂C(CH₃)₂ S₄Bt,
[C₁₆H₃₃O—(CH₂—CH₂O)₄](EtO)₂Si(CH₂)₂C(CH₃)₂ S₄Bt,
[C₁₆H₃₃O—(CH₂—CH₂O)₅](EtO)₂Si(CH₂)₂C(CH₃)₂ S₄Bt,
[C₁₆H₃₃O—(CH₂—CH₂O)₆](EtO)₂Si(CH₂)₂C(CH₃)₂ S₄Bt,
[C₁₇H₃₅O—(CH₂—CH₂O)₂](EtO)₂Si(CH₂)₂C(CH₃)₂ S₄Bt,
[C₁₇H₃₅O—(CH₂—CH₂O)₃](EtO)₂Si(CH₂)₂C(CH₃)₂ S₄Bt,
[C₁₇H₃₅O—(CH₂—CH₂O)₄](EtO)₂Si(CH₂)₂C(CH₃)₂ S₄Bt,
[C₁₇H₃₅O—(CH₂—CH₂O)₅](EtO)₂Si(CH₂)₂C(CH₃)₂ S₄Bt,
[C₁₇H₃₅O—(CH₂—CH₂O)₆](EtO)₂Si(CH₂)₂C(CH₃)₂ S₄Bt,
[C₁₁H₂₃O—(CH₂—CH₂O)₂]₂(EtO)Si(CH₂)₂C(CH₃)₂ S₄Bt,
[C₁₁H₂₃O—(CH₂—CH₂O)₃]₂(EtO)Si(CH₂)₂C(CH₃)₂ S₄Bt,
[C₁₁H₂₃O—(CH₂—CH₂O)₄]₂(EtO)Si(CH₂)₂C(CH₃)₂ S₄Bt,
[C₁₁H₂₃O—(CH₂—CH₂O)₅]₂(EtO)Si(CH₂)₂C(CH₃)₂ S₄Bt,
[C₁₁H₂₃O—(CH₂—CH₂O)₆]₂(EtO)Si(CH₂)₂C(CH₃)₂ S₄Bt,
[C₁₂H₂₅O—(CH₂—CH₂O)₂]₂(EtO)Si(CH₂)₂C(CH₃)₂ S₄Bt,
[C₁₂H₂₅O—(CH₂—CH₂O)₃]₂(EtO)Si(CH₂)₂C(CH₃)₂ S₄Bt,
[C₁₂H₂₅O—(CH₂—CH₂O)₄]₂(EtO)Si(CH₂)₂C(CH₃)₂ S₄Bt,
[C₁₂H₂₅O—(CH₂—CH₂O)₅]₂(EtO)Si(CH₂)₂C(CH₃)₂ S₄Bt,
[C₁₂H₂₅O—(CH₂—CH₂O)₆]₂(EtO)Si(CH₂)₂C(CH₃)₂ S₄Bt,
[C₁₃H₂₇O—(CH₂—CH₂O)₂]₂(EtO)Si(CH₂)₂C(CH₃)₂ S₄Bt,
[C₁₃H₂₇O—(CH₂—CH₂O)₃]₂(EtO)Si(CH₂)₂C(CH₃)₂ S₄Bt,
[C₁₃H₂₇O—(CH₂—CH₂O)₄]₂(EtO)Si(CH₂)₂C(CH₃)₂ S₄Bt,
[C₁₃H₂₇O—(CH₂—CH₂O)₅]₂(EtO)Si(CH₂)₂C(CH₃)₂ S₄Bt,
[C₁₃H₂₇O—(CH₂—CH₂O)₆]₂(EtO)Si(CH₂)₂C(CH₃)₂ S₄Bt,
[C₁₄H₂₉O—(CH₂—CH₂O)₂]₂(EtO)Si(CH₂)₂C(CH₃)₂ S₄Bt,
[C₁₄H₂₉O—(CH₂—CH₂O)₃]₂(EtO)Si(CH₂)₂C(CH₃)₂ S₄Bt,
[C₁₄H₂₉O—(CH₂—CH₂O)₄]₂(EtO)Si(CH₂)₂C(CH₃)₂ S₄Bt,
[C₁₄H₂₉O—(CH₂—CH₂O)₅]₂(EtO)Si(CH₂)₂C(CH₃)₂ S₄Bt,
[C₁₄H₂₉O—(CH₂—CH₂O)₆]₂(EtO)Si(CH₂)₂C(CH₃)₂ S₄Bt,
[C₁₅H₃₁O—(CH₂—CH₂O)₂]₂(EtO)Si(CH₂)₂C(CH₃)₂ S₄Bt,
[C₁₅H₃₁O—(CH₂—CH₂O)₃]₂(EtO)Si(CH₂)₂C(CH₃)₂ S₄Bt,
[C₁₅H₃₁O—(CH₂—CH₂O)₄]₂(EtO)Si(CH₂)₂C(CH₃)₂ S₄Bt,
[C₁₅H₃₁O—(CH₂—CH₂O)₅]₂(EtO)Si(CH₂)₂C(CH₃)₂ S₄Bt,
[C₁₅H₃₁O—(CH₂—CH₂O)₆]₂(EtO)Si(CH₂)₂C(CH₃)₂ S₄Bt,
[C₁₆H₃₃O—(CH₂—CH₂O)₂]₂(EtO)Si(CH₂)₂C(CH₃)₂ S₄Bt,
[C₁₆H₃₃O—(CH₂—CH₂O)₃]₂(EtO)Si(CH₂)₂C(CH₃)₂ S₄Bt,
[C₁₆H₃₃O—(CH₂—CH₂O)₄]₂(EtO)Si(CH₂)₂C(CH₃)₂ S₄Bt,
[C₁₆H₃₃O—(CH₂—CH₂O)₅]₂(EtO)Si(CH₂)₂C(CH₃)₂ S₄Bt,
[C₁₆H₃₃O—(CH₂—CH₂O)₆]₂(EtO)Si(CH₂)₂C(CH₃)₂ S₄Bt,
[C₁₇H₃₅O—(CH₂—CH₂O)₂]₂(EtO)Si(CH₂)₂C(CH₃)₂ S₄Bt,
[C₁₇H₃₅O—(CH₂—CH₂O)₃]₂(EtO)Si(CH₂)₂C(CH₃)₂ S₄Bt,
[C₁₇H₃₅O—(CH₂—CH₂O)₄]₂(EtO)Si(CH₂)₂C(CH₃)₂ S₄Bt,
[C₁₇H₃₅O—(CH₂—CH₂O)₅]₂(EtO)Si(CH₂)₂C(CH₃)₂ S₄Bt,
[C₁₇H₃₅O—(CH₂—CH₂O)₆]₂(EtO)Si(CH₂)₂C(CH₃)₂ S₄Bt,
[C₁₁H₂₃O—(CH₂—CH₂O)₂]₃Si(CH₂)₂C(CH₃)₂ S₄Bt,
[C₁₁H₂₃O—(CH₂—CH₂O)₃]₃Si(CH₂)₂C(CH₃)₂ S₄Bt,
[C₁₁H₂₃O—(CH₂—CH₂O)₄]₃Si(CH₂)₂C(CH₃)₂ S₄Bt,
[C₁₁H₂₃O—(CH₂—CH₂O)₅]₃Si(CH₂)₂C(CH₃)₂ S₄Bt,
[C₁₁H₂₃O—(CH₂—CH₂O)₆]₃Si(CH₂)₂C(CH₃)₂ S₄Bt,
[C₁₂H₂₅O—(CH₂—CH₂O)₂]₃Si(CH₂)₂C(CH₃)₂ S₄Bt,
[C₁₂H₂₅O—(CH₂—CH₂O)₃]₃Si(CH₂)₂C(CH₃)₂ S₄Bt,
[C₁₂H₂₅O—(CH₂—CH₂O)₄]₃Si(CH₂)₂C(CH₃)₂ S₄Bt,
[C₁₂H₂₅O—(CH₂—CH₂O)₅]₃Si(CH₂)₂C(CH₃)₂ S₄Bt,
[C₁₂H₂₅O—(CH₂—CH₂O)₆]₃Si(CH₂)₂C(CH₃)₂ S₄Bt
[C₁₃H₂₇O—(CH₂—CH₂O)₂]₃Si(CH₂)₂C(CH₃)₂ S₄Bt,
[C₁₃H₂₇O—(CH₂—CH₂O)₃]₃Si(CH₂)₂C(CH₃)₂ S₄Bt,
[C₁₃H₂₇O—(CH₂—CH₂O)₄]₃Si(CH₂)₂C(CH₃)₂ S₄Bt,
[C₁₃H₂₇O—(CH₂—CH₂O)₅]₃Si(CH₂)₂C(CH₃)₂ S₄Bt,
[C₁₃H₂₇O—(CH₂—CH₂O)₆]₃Si(CH₂)₂C(CH₃)₂ S₄Bt,
[C₁₄H₂₉O—(CH₂—CH₂O)₂]₃Si(CH₂)₂C(CH₃)₂ S₄Bt,
[C₁₄H₂₉O—(CH₂—CH₂O)₃]₃Si(CH₂)₂C(CH₃)₂ S₄Bt,
[C₁₄H₂₉O—(CH₂—CH₂O)₄]₃Si(CH₂)₂C(CH₃)₂ S₄Bt,
[C₁₄H₂₉O—(CH₂—CH₂O)₅]₃Si(CH₂)₂C(CH₃)₂ S₄Bt,
[C₁₄H₂₉O—(CH₂—CH₂O)₆]₃Si(CH₂)₂C(CH₃)₂ S₄Bt,
[C₁₅H₃₁O—(CH₂—CH₂O)₂]₃Si(CH₂)₂C(CH₃)₂ S₄Bt,
[C₁₅H₃₁O—(CH₂—CH₂O)₃]₃Si(CH₂)₂C(CH₃)₂ S₄Bt,
[C₁₅H₃₁O—(CH₂—CH₂O)₄]₃Si(CH₂)₂C(CH₃)₂ S₄Bt,
[C₁₅H₃₁O—(CH₂—CH₂O)₅]₃Si(CH₂)₂C(CH₃)₂ S₄Bt,
[C₁₅H₃₁O—(CH₂—CH₂O)₆]₃Si(CH₂)₂C(CH₃)₂ S₄Bt,
[C₁₆H₃₃O—(CH₂—CH₂O)₂]₃Si CH₂)₂C(CH₃)₂ S₄Bt,
[C₁₆H₃₃O—(CH₂—CH₂O)₃]₃Si(CH₂)₂C(CH₃)₂ S₄Bt,
[C₁₆H₃₃O—(CH₂—CH₂O)₄]₃Si(CH₂)₂C(CH₃)₂ S₄Bt,
[C₁₆H₃₃O—(CH₂—CH₂O)₅]₃Si(CH₂)₂C(CH₃)₂ S₄Bt,
[C₁₆H₃₃O—(CH₂—CH₂O)₆]₃Si(CH₂)₂C(CH₃)₂ S₄Bt,
[C₁₇H₃₅O—(CH₂—CH₂O)₂]₃Si(CH₂)₂C(CH₃)₂ S₄Bt,
[C₁₇H₃₅O—(CH₂—CH₂O)₃]₃Si(CH₂)₂C(CH₃)₂ S₄Bt,
[C₁₇H₃₅O—(CH₂—CH₂O)₄]₃Si(CH₂)₂C(CH₃)₂ S₄Bt,
[C₁₇H₃₅O—(CH₂—CH₂O)₅]₃Si(CH₂)₂C(CH₃)₂ S₄Bt,
[C₁₇H₃₅O—(CH₂—CH₂O)₆]₃Si(CH₂)₂C(CH₃)₂ S₄Bt,
where Bt is a benzothiazole group.

Benzothiazole-containing silanes of the formula I may preferably be:
silanes of the formula I with $R^1$=—O—C₂H₅, $R^2$=—O—(CH₂CH₂O)₅—C₁₃H₂₇, and $R^3$=—(CH₂)₃— and
silanes of the formula I with $R^1$=—O—C₂H₅, $R^2$=—O—(CH₂CH₂O)₅—C₁₃H₂₇, and $R^3$=—(CH₂)₂C(CH₃)₂—.

An especially preferred compound is [C₁₃H₂₇O—(CH₂—CH₂O)₅](EtO)₂Si(CH₂)₃ S₂Bt.

The invention further provides a process for preparing the inventive benzothiazole-containing silanes of the formula I

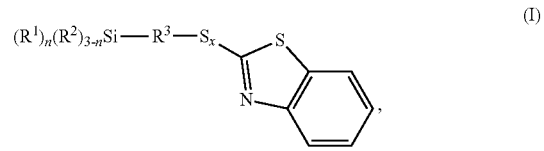

where $R^1$, $R^2$, $R^3$, x and n are each as defined above, which is characterized in that a benzothiazole-containing silane of the formula II

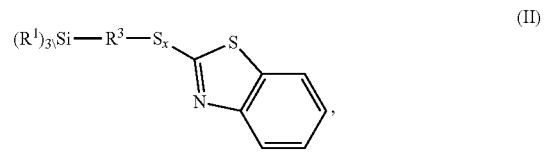

is reacted with a compound of formula III

Benzothiazole-containing silanes of the formula II may preferably be: (EtO)₃Si(CH₂)₃ S₂Bt, (EtO)₃Si(CH₂)₂C(CH₃)₂ S₂Bt, (EtO)₃Si(CH₂)₃ S₃Bt, (EtO)₃Si(CH₂)₂C(CH₃)₂ S₃Bt or (EtO)₃Si(CH₂)₃ S₄Bt, (EtO)₃Si(CH₂)₂C(CH₃)₂ S₄Bt,
where Bt is a benzothiazole group.

Compounds of the formula III may preferably be: [C₁₁H₂₃O—(CH₂—CH₂O)₂]OH, [C₁₁H₂₃O—(CH₂—CH₂O)₃]OH, [C₁₁H₂₃O—(CH₂—CH₂O)₄]OH, [C₁₁H₂₃O—(CH₂—CH₂O)₅]OH, [C₁₁H₂₃O—(CH₂—CH₂O)₆]OH, [C₁₂H₂₅O—(CH₂—CH₂O)₂]OH, [C₁₂H₂₅O—(CH₂—

$CH_2O)_3]OH$, $[C_{12}H_{25}O—(CH_2—CH_2O)_4]OH$, $[C_{12}H_{25}O—(CH_2—CH_2O)_5]OH$, $[C_{12}H_{25}O—(CH_2—CH_2O)_6]OH$, $[C_{13}H_{27}O—(CH_2—CH_2O)_2]OH$, $[C_{13}H_{27}O—(CH_2—CH_2O)_3]OH$, $[C_{13}H_{27}O—(CH_2—CH_2O)_4]OH$, $[C_{13}H_{27}O—(CH_2—CH_2O)_5]OH$, $[C_{13}H_{27}O—(CH_2—CH_2O)_6]OH$, $[C_{14}H_{29}O—(CH_2—CH_2O)_3]OH$, $[C_{14}H_{29}O—(CH_2—CH_2O)_3]OH$, $[C_{14}H_{29}O—(CH_2—CH_2O)_4]OH$, $[C_{14}H_{29}O—(CH_2—CH_2O)_5]OH$, $[C_{14}H_{29}O—(CH_2—CH_2O)_6]OH$, $[C_{15}H_{31}O—(CH_2—CH_2O)_2]OH$, $[C_{15}H_{31}O—(CH_2—CH_2O)_3]OH$, $[C_{15}H_{31}O—(CH_2—CH_2O)_4]OH$, $[C_{15}H_{31}O—(CH_2—CH_2O)_5]OH$, $[C_{15}H_{31}O—(CH_2—CH_2O)_6]OH$, $[C_{16}H_{33}O—(CH_2—CH_2O)_2]OH$, $[C_{16}H_{33}O—(CH_2—CH_2O)_3]OH$, $[C_{16}H_{33}O—(CH_2—CH_2O)_4]OH$, $[C_{16}H_{33}O—(CH_2—CH_2O)_5]OH$, $[C_{16}H_{33}O—(CH_2—CH_2O)_6]OH$, $[C_{17}H_{35}O—(CH_2—CH_2O)_2]OH$, $[C_{17}H_{35}O—(CH_2—CH_2O)_3]OH$, $[C_{17}H_{35}O—(CH_2—CH_2O)_4]OH$, $[C_{17}H_{35}O—(CH_2—CH_2O)_5]OH$ or $[C_{17}H_{35}O—(CH_2—CH_2O)_6]OH$.

The inventive benzothiazole-containing silane can be analysed by means of $^1H$, $^{13}C$ and $^{29}Si$ NMR.

In the process according to the invention, the benzothiazole-containing silane of the formula II may be metered into the compound of the formula III.

In the process according to the invention, compound of the formula III may preferably be metered into benzothiazole-containing silane of the formula II.

In the process according to the invention, the benzothiazole-containing silane of the formula II can be used relative to the compound of the formula III in a molar ratio of 1:1 to 1:3, preferably 1:1 to 1:2, more preferably in a ratio of 1:1 to 1.1:1.

The process according to the invention can be conducted in the presence of a catalyst with elimination of $R^1$—H.

The compounds used as catalysts for the reaction may be metal-containing or metal-free.

Metal-free compounds used may be organic acids, for example trifluoroacetic acid, trifluoromethanesulfonic acid or p-toluenesulfonic acid, trialkylammonium compounds $E_3NH^+Z^-$ or bases, for example trialkylamines $NE_3$ with E=alkyl and $Z^-$=counterion.

The metal compounds used as catalysts for the reaction may be transition metal compounds.

Metal compounds used for the catalysts may be metal chlorides, metal oxides, metal oxychlorides, metal sulfides, metal sulfochlorides, metal alkoxides, metal thiolates, metal oxyalkoxides, metal amides, metal imides or transition metal compounds comprising multiple bound ligands.

For example, metal compounds used may be halides, amides or alkoxides of main group 3 ($M^{3+}$=B, Al, Ga, In, Tl: $M^{3+}(OMe)_3$, $M^{3+}(OEt)_3$, $M^{3+}(OC_3H_7)_3$, $M^{3+}(OC_4H_9)_3$), halides, oxides, sulfides, imides, alkoxides, amides, thiolates and combinations of the substituent classes mentioned with multiple bound ligands on compounds of the lanthanide group (rare earths, atomic numbers 58 to 71 in the Periodic Table of the Elements), halides, oxides, sulfides, imides, alkoxides, amides, thiolates and combinations of the substituent classes mentioned with multiple bound ligands on compounds of transition group 3 ($M^{3+}$=Sc, Y, La: $M^{3+}(OMe)_3$, $M^{3+}(OEt)_3$, $M^{3+}(OC_3H_7)_3$, $M^{3+}(OC_4H_9)_3$, $cpM^{3+}(Cl)_2$, cp $cpM^{3+}(OMe)_2$, $cpM^{3+}(OEt)_2$, $cpM^{3+}(NMe_2)_2$ with cp=cyclopentadienyl), halides, sulfides, amides, thiolates or alkoxides of main group 4 ($M^{4+}$=Si, Ge, Sn, Pb: $M^{4+}(OMe)_4$, $M^{4+}(OEt)_4$, $M^{4+}(OC_3H_7)_4$, $M^{4+}(OC_4H_9)_4$; $M^{2+}$=Sn, Pb: $M^{2+}(OMe)_2$, $M^{2+}(OEt)_2$, $M^{2+}(OC_3H_7)_2$, $M^{2+}(OC_4H_9)_2$), tin dilaurate, tin diacetate, $Sn(OBu)_2$ halides, oxides, sulfides, imides, alkoxides, amides, thiolates and combinations of the substituent classes mentioned with multiple bound ligands on compounds of transition group 4 ($M^{4+}$=Ti, Zr, Hf: $(M^{4+}(F)_4$, $M^{4+}(Cl)_4$, $M^{4+}(Br)_4$, $M^{4+}(I)_4$; $M^{4+}(OMe)_4$, $M^{4+}(OEt)_4$, $M^{4+}(OC_3H_7)_4$, $M^{4+}(OC_4H_9)_4$, $cp_2Ti(Cl)_2$, $cp_2Zr(Cl)_2$, $cp_2Hf(Cl)_2$, $cp_2Ti(OMe)_2$, $cp_2Zr(OMe)_2$, $cp_2Hf(OMe)_2$, $cpTi(Cl)_3$, $cpZr(Cl)_3$, $cpHf(Cl)_3$; $cpTi(OMe)_3$, $cpZr(OMe)_3$ $cpHf(OMe)_3$, $M^{4+}(NMe_2)_4$, $M^{4±}(NEt_2)_4$, $M^{4+}(NHC_4H_9)_4$), halides, oxides, sulfides, imides, alkoxides, amides, thiolates and combinations of the substituent classes mentioned with multiple bound ligands on compounds of transition group 5 ($M^{5+}$, $M^{4+}$ or $M^{3+}$=V, Nb, Ta: $M^{5+}(OMe)_5$, $M^{5+}(OEt)_5$, $M^{5+}(OC_3F_{17})_5$, $M^{5+}(OC_4H_9)_5$, $M^{3+}O(OMe)_3$, $M^{3+}O(OEt)_3$, $M^{3+}O(OC_3H_7)_3$, $M^{3+}O(OC_4H_5)_3$, $cpV(OMe)_4$, $cpNb(OMe)_3$, $cpTa(OMe)_3$; $cpV(OMe)_2$, $cpNb(OMe)_3$, $cpTa(OMe)_3$), halides, oxides, sulfides, imides, alkoxides, amides, thiolates and combinations of the substituent classes mentioned with multiple bound ligands on compounds of transition group 6 ($M^{6+}$, $M^{5+}$ or $M^{4+}$=Cr, Mo, W: $M^{6+}(OMe)_6$, $M^{6+}(OEt)_6$, $M^{6+}(OC_3H_7)_6$, $M^{6+}(OC_4H_9)_6$, $M^{6+}O(OMe)_4$, $M^{6+}O(OEt)_4$, $M^{6+}O(OC_3H_7)_4$, $M^{6+}O(OC_4H_9)_4$, $M^{6+}O_2(OMe)_2$, $M^{6+}O_2(OEt)_2$, $M^{6+}O_2(OC_3H_7)_2$, $M^{6+}O_2(OC_4H_9)_2$, $M^{6+}O_2(OSiMe_3)_2$) or halides, oxides, sulfides, imides, alkoxides, amides, thiolates and combinations of the substituent classes mentioned with multiple bound ligands on compounds of transition group 7 ($M^{7+}$, $M^{6+}$, $M^{5+}$ or $M^{4+}$=Mn, Re: $M^{7+}O(OMe)_5$, $M^{7+}O(OEt)_5$, $M^{7+}O(OC_3H_7)_5$, $M^{7+}O(OC_4H_9)_5$, $M^{7+}O_2(OMe)_3$, $M^{7+}O_2(OEt)_3$, $M^{7+}O_2(OC_3H_7)_3$, $M^{7+}O_2(OC_4H_9)_3$, $M^{7+}O_2(OSiMe_3)_3$, $M^{7+}O_3(OSiMe_3)$, $M^{7+}O_3(CH_3)$).

The metal and transition metal compounds may have a free coordination site on the metal.

Catalysts used may also be metal or transition metal compounds which are formed by addition of water to give hydrolysable metal or transition metal compounds.

In a particular embodiment, it is possible to use titanates, for example tetra-n-butyl orthotitanate or tetraisopropyl orthotitanate, as catalysts.

The reaction can be conducted with exclusion of air.

The reaction may be carried out under a protective gas atmosphere, for example under argon or nitrogen, preferably under nitrogen.

The process according to the invention can be conducted at atmospheric pressure, elevated pressure or reduced pressure. Preferably, the process according to the invention can be conducted under reduced pressure.

Elevated pressure may be a pressure of 1.1 bar to 100 bar, preferably of 1.5 bar to 50 bar, more preferably of 2 bar to 20 bar and very preferably of 2 to 10 bar.

Reduced pressure may be a pressure of 1 mbar to 1000 mbar, preferably 1 mbar to 500 mbar, more preferably 1 mbar to 250 mbar, very preferably 5 mbar to 100 mbar.

The reaction can be conducted at temperatures between 20 and 200° C., preferably between 50 and 170° C., more preferably between 80 and 150° C. To avoid condensation reactions it may the advantageous to carry out the reaction in a water-free environment, ideally in an inert gas atmosphere.

The alcohol $R^1$—H can be removed, preferably distilled off, after or during the reaction.

The reaction product can subsequently be dried.

The benzothiazole-containing silanes of the formula I can be used as adhesion promoters between inorganic materials, for example glass beads, glass flakes, glass surfaces, glass fibres, or oxidic fillers, preferably silicas such as precipitated and fumed silicas, and organic polymers, for example thermosets, thermoplastics or elastomers, or as crosslinking agents and surface modifiers for oxidic surfaces.

The benzothiazole-containing silanes of the formula I can be used as coupling reagents in filled rubber mixtures, examples being tyre treads, industrial rubber articles or footwear soles.

The invention further provides rubber mixtures comprising
(A) a rubber or a mixture of rubbers,
(B) a filler and
(C) at least one benzothiazole-containing silane of the general formula I.

The rubber (A) may preferably be a diene rubber, preferably natural rubber, polyisoprene, polybutadiene, styrene-butadiene copolymers, isobutylene/isoprene copolymers, butadiene/acrylonitrile copolymers, ethylene/propylene/diene copolymers (EPDM), partly hydrogenated or fully hydrogenated NBR rubber.

Rubber used may be natural rubber and/or synthetic rubbers. Preferred synthetic rubbers are described for example in W. Hofmann, Kautschuktechnologie [Rubber Technology], Genter Verlag, Stuttgart 1980. They may include:
polybutadiene (BR),
polyisoprene (IR),
styrene/butadiene copolymers, for example emulsion SBR (E-SBR) or solution SBR (S-SBR), preferably having styrene contents of 1% to 60% by weight, more preferably 5% to 50% by weight (SBR),
chloroprene (CR)
isobutylene/isoprene copolymers (IIR),
butadiene/acrylonitrile copolymers having acrylonitrile contents of 5% to 60% by weight, preferably 10% to 50% by weight (NBR),
partly hydrogenated or fully hydrogenated NBR rubber (HNBR),
ethylene/propylene/diene copolymers (EPDM)
abovementioned rubbers which also have functional groups, e.g. carboxy, silanol or epoxy groups, for example epoxidized NR, carboxy-functionalized NBR or amine(NR$_2$), silanol(—SiOH)— or siloxy(—Si—OR)-functionalized SBR,
and mixtures of these rubbers. The rubbers mentioned may additionally be silicon- or tin-coupled.

In a preferred embodiment, the rubbers may be sulfur-vulcanizable. For the production of car tyre treads it is in particular possible to use anionically polymerized S-SBR rubbers (solution SBR) with a glass transition temperature above −50° C., and also mixtures of these with diene rubbers. It is particularly preferably possible to use S-SBR rubbers whose butadiene portion has more than 20% by weight vinyl fraction. It is very particularly preferably possible to use S-SBR rubbers whose butadiene portion has more than 50% by weight vinyl fraction.

It is preferably possible to use mixtures of the abovementioned rubbers which have more than 50% by weight, preferably more than 60% by weight, S-SBR content.

The rubber may be a functionalized rubber, where the functional groups may be amine and/or amide and/or urethane and/or urea and/or aminosiloxane and/or siloxane and/or silyl and/or alkylsilyl, for example N,N-bis(trimethylsilyl)aminopropylmethyldiethoxysilane or methyltriphenoxysilane, and/or halogenated silyl and/or silane sulfide and/or thiol and/or hydroxyl and/or ethoxy and/or epoxy and/or carboxyl and/or tin, for example tin tetrachloride or dibutyldichlorotin, and/or silanol and/or hexachlorodisiloxane and/or thiocarboxy and/or nitrile and/or nitroxide and/or amido and/or imino and/or urethane and/or urea and/or dimethylimidazolidinone and/or 2-methyl-2-thiazoline and/or 2-benzothiazoleacetonitrile and/or 2-thiophenecarbonitrile and/or 2-(N-methyl-N-3-trimethoxysilylpropyl)thiazoline and/or carbodiimide and/or N-substituted aminoaldehyde and/or N-substituted aminoketone and/or N-substituted aminothioaldehyde and/or N-substituted aminothioketone and/or benzophenone and/or thiobenzophenone with amino group and/or isocyanate and/or isothiocyanate and/or hydrazine and/or sulfonyl and/or sulfinyl and/or oxazoline and/or ester groups.

Fillers employable for the inventive rubber mixtures include the following fillers:

Carbon blacks: the carbon blacks to be used here are produced by the lamp-black process, furnace-black process, gas-black process or thermal process and have BET surface areas of from 20 to 200 m$^2$/g. The carbon blacks may optionally also contain heteroatoms, for example Si.

Amorphous silicas produced for example by precipitation from solutions of silicates or flame-hydrolysis of silicon halides with specific surface areas of from 5 to 1000 m$^2$/g, preferably from 20 to 400 m$^2$/g (BET surface area) and with primary particle sizes of from 10 to 400 nm. The silicas may optionally also be in the form of mixed oxides with other metal oxides, such as oxides of Al, Mg, Ca, Ba, Zn and titanium.

Synthetic silicates such as aluminium silicate, alkaline earth metal silicates such as magnesium silicate or calcium silicate, with BET surface areas of from 20 to 400 m$^2$/g and primary particle diameters of from 10 to 400 nm.

Synthetic or natural aluminium oxides and synthetic or natural aluminium hydroxides.

Natural silicates, such as kaolin and other naturally occurring silicas.

Glass fibres and glass-fibre products (mats, strands) or glass microbeads.

It is preferably possible to use amounts of from 5 to 150 parts by weight, based in each case on 100 parts of rubber, of amorphous silicas produced by precipitation from solutions of silicates, with BET surface areas of from 20 to 400 m$^2$/g, particularly from 100 m$^2$/g to 250 m$^2$/g.

With very particular preference, it is possible to use precipitated silicas as filler.

The recited fillers may be used alone or in admixture.

The rubber mixtures according to the invention may contain 5 to 150 parts by weight of filler (B) and 0.1 to 25 parts by weight, preferably 2 to 20 parts by weight, more preferably 5 to 15 parts by weight, of benzothiazole-containing silane of the formula I (C), where the parts by weight are based on 100 parts by weight of rubber.

The weight ratio of the silane according to the invention to the vulcanization accelerator used may be greater than 3, preferably greater than 5.

Advantages of the inventive benzothiazole-containing silanes of the formula I is that they enable the production of highly strengthened rubber mixtures having adequate processing characteristics. A further advantage of the silanes according to the invention is that they lead to high strengthening even in rubber mixtures including only a small proportion of vulcanization accelerators.

EXAMPLES

Comparative Example 1: Preparation of 2-[[3-(triethoxysilyl)propyl]dithio]benzothiazole 2-[[3-(Triethoxysilyl)propyl]dithio]benzothiazole is prepared as described in U.S. Pat. No. 6,465,581 in Example 1, but with $CH_2Cl_2$ as solvent.

Example 1: Preparation of 2-[[((3,6,9,12,15-pentaoxaoctacosoxy)(diethoxy)silyl)propyl]dithio]benzothiazole To 2-[[3-(triethoxysilyl)propyl]dithio]benzothiazole (0.150 mol) from Comparative Example 1 are added 3,6,9,12,15-pentaoxaoctacosan-1-ol (0.150 mol) and $Ti(OnBu)_4$ (0.05% by weight/2-[[3-(triethoxysilyl)propyl]dithio]benzothiazole). The mixture is heated to 140° C., the ethanol formed is distilled off and, after 1 h, a pressure of 400-600 mbar is established. After 1 h, the pressure is reduced to 16-200 mbar and the mixture is stirred for 4 h. Subsequently, the reaction mixture is allowed to cool to room temperature and the reaction product is filtered. 2-[[((3,6,9,12,15-Pentaoxaoctacosoxy)(diethoxy)silyl)propyl]dithio]benzothiazole (yield: 85%, transesterification level 31%=0.93 mol polyether alcohol/Si) is obtained as a viscous liquid.

The purity is determined by means of $^{13}C$ NMR. In the NMR, the shift of the $CH_2$ group of 61.8 ppm (adjacent to the OH group) compared to the bound variant at 62.1 ppm is characteristic, and it is possible to make a comparison against remaining epoxy groups on the silicon atom at 58.0 ppm.

Example 2: Preparation of 2-[[((bis-3,6,9,12,15-pentaoxaoctacosoxy)(ethoxy)silyl)propyl]dithio]benzothiazole To 2-[[3-(triethoxysilyl)propyl]dithio]benzothiazole (0.150 mol) from Comparative Example 1 are added 3,6,9,12,15-pentaoxaoctacosan-1-ol (0.300 mol) and $Ti(OnBu)_4$ (0.05% by weight/2-[[3-(triethoxysilyl)propyl]dithio]benzothiazole). The mixture is heated to 140° C., the ethanol formed is distilled off and, after 1 h, a pressure of 400-600 mbar is established. After 1 h, the pressure is reduced to 16-200 mbar and the mixture is stirred for 4 h. Subsequently, the reaction mixture is allowed to cool to room temperature and the reaction product is filtered. 2-[[((Bis-3,6,9,12,15-pentaoxaoctacosoxy)(ethoxy)silyl)propyl]dithio]benzothiazole (yield: 98%, transesterification level 65%=1.95 mol polyether alcohol/Si) is obtained as a viscous liquid.

The purity is determined by means of $^{13}C$ NMR. In the NMR, the shift of the $CH_2$ group of 61.8 ppm (adjacent to the OH group) compared to the bound variant at 62.1 ppm is characteristic, and it is possible to make a comparison against remaining epoxy groups on the silicon atom at 58.0 ppm.

Example 3: Preparation of 2-[[((tris-3,6,9,12,15-pentaoxaoctacosoxy)silyl)propyl]dithio]benzothiazole To 2-[[3-(triethoxysilyl)propyl]dithio]benzothiazole (0.150 mol) from Comparative Example 1 are added 3,6,9,12,15-pentaoxaoctacosan-1-ol (0.450 mol) and $Ti(OnBu)_4$ (0.05% by weight/2-[[3-(triethoxysilyl)propyl]dithio]benzothiazole). The mixture is heated to 140° C., the ethanol formed is distilled off and, after 1 h, a pressure of 400-600 mbar is established. After 1 h, the pressure is reduced to 16-200 mbar and the mixture is stirred for 4 h. Subsequently, the reaction mixture is allowed to cool to room temperature and the reaction product is filtered. 2-[[(Tris-3,6,9,12,15-pentaoxaoctacosoxy)silyl)propyl]dithio]benzothiazole (yield: 94%, transesterification level >95%=>2.85 mol polyether alcohol/Si) is obtained as a viscous liquid.

The purity is determined by means of $^{13}C$ NMR. In the NMR, the shift of the $CH_2$ group of 61.8 ppm (adjacent to the OH group) compared to the bound variant at 62.1 ppm is characteristic, and it is possible to make a comparison against remaining epoxy groups on the silicon atom at 58.0 ppm.

Example 4: Rubber Mixtures

In this example, the silanes according to the invention are compared to the benzothiazole-containing silanes known from the prior art.

The formulation used for the rubber mixtures is specified in Table 1 below. In this table, the unit phr means parts by weight based on 100 parts of the crude rubber employed.

The inventive silane I used for example mixture I is the inventive silane prepared in Example I. The structure thereof corresponds to the general formula I with $R^1$=ethoxy, $R^2$=O$(C_2H_4O)_5C_{13}H_{27}$, $R^3$=—$CH_2CH_2CH_2$— and n=2.

The inventive silane II used for example mixture II is the inventive silane II prepared in Example II. The structure thereof corresponds to the general formula I with $R^1$=ethoxy, $R^2$=O$(C_2H_4O)_5C_{13}H_{27}$, $R^3$=—$CH_2CH_2CH_2$— and n=1.

The inventive silane III used for example mixture III is the inventive silane prepared in Example III. The structure thereof corresponds to the general formula I with $R^2$=O$(C_2H_4O)_5C_{13}H_{27}$, $R^3$=—$CH_2CH_2CH_2$— and n=0.

The silanes according to the invention were metered in such that the ratio of silane to the vulcanization accelerator Vulkacit CZ exceeds the value of 5.

Typically, amounts of vulcanization accelerator of 1.5 phr to 2.5 phr are used in rubber mixtures. In this example, only 0.8 phr of the vulcanization accelerator Vulkacit CZ is used, and so the ratio of the silane used to the accelerator is greater than 5 in each case.

The silanes Si 266® and Si 363™ used for the reference mixtures I and II are commercially available from Evonik Industries AG. The silane used for reference mixture III is 2-[[3-(triethoxysilyl)propyl]dithio]benzothiazole, prepared in Comparative Example 1.

TABLE 1

|  |  | Reference Mixture I | Reference Mixture II | Reference Mixture III | Example Mixture I | Example Mixture II | Example Mixture III |
|---|---|---|---|---|---|---|---|
| Stage 1 |  |  |  |  |  |  |  |
| Buna VSL 4526-2 | phr | 96.3 | 96.3 | 96.3 | 96.3 | 96.3 | 96.3 |
| Buna CB 24 | phr | 30.0 | 30.0 | 30.0 | 30.0 | 30.0 | 30.0 |
| ULTRASIL ® 7000 GR | phr | 80.0 | 80.0 | 80.0 | 80.0 | 80.0 | 80.0 |
| Si 266 ® | phr | 5.80 |  |  |  |  |  |

TABLE 1-continued

|  |  | Reference Mixture I | Reference Mixture II | Reference Mixture III | Example Mixture I | Example Mixture II | Example Mixture III |
|---|---|---|---|---|---|---|---|
| Si 363 ™ | phr |  | 9.00 |  |  |  |  |
| 2-[[3(Triethoxysilyl)propyl]dithio]benzothiazole | phr |  |  | 3.68 |  |  |  |
| Silane from Example 1 | phr |  |  |  | 7.09 |  |  |
| Silane from Example 2 | phr |  |  |  |  | 10.51 |  |
| Silane from Example 3 | phr |  |  |  |  |  | 13.92 |
| N 330 | phr | 5.0 | 5.0 | 5.0 | 5.0 | 5.0 | 5.0 |
| ZnO | phr | 2.0 | 2.0 | 2.0 | 2.0 | 2.0 | 2.0 |
| Stearic acid | phr | 2.0 | 2.0 | 2.0 | 2.0 | 2.0 | 2.0 |
| Oil | phr | 8.8 | 8.8 | 8.8 | 8.8 | 8.8 | 8.8 |
| Wax | phr | 2.0 | 2.0 | 2.0 | 2.0 | 2.0 | 2.0 |
| 6 PPD | phr | 2.0 | 2.0 | 2.0 | 2.0 | 2.0 | 2.0 |
| TMQ | phr | 1.5 | 1.5 | 1.5 | 1.5 | 1.5 | 1.5 |
| Stage 2 |  |  |  |  |  |  |  |
| Stage 1 batch |  |  |  |  |  |  |  |
| Stage 3 |  |  |  |  |  |  |  |
| Stage 2 batch |  |  |  |  |  |  |  |
| CBS | phr | 0.8 | 0.8 | 0.8 | 0.8 | 0.8 | 0.8 |
| Sulfur | phr | 2.0 | 2.0 | 2.0 | 2.0 | 2.0 | 2.0 |
| TBzTD | phr | 0.4 | 0.4 | 0.4 | 0.4 | 0.4 | 0.4 |

Substances used:

[a] The polymer VSL 4526-2 is a solution-polymerized SBR copolymer from Lanxess AG, having a styrene content of 26% by weight and a butadiene content of 74% by weight. The copolymer contains 26% by weight of oil and has a Mooney viscosity (ML 1+4/100° C.) of 50.

The polymer Buna CB 24 is a cis-1,4-polybutadiene (neodymium type) from Bayer AG, having a cis-1,4 content of at least 96% and a Mooney viscosity of 44.

ULTRASIL® 7000 GR is a readily dispersible silica from Evonik Industries AG and has a BET surface area of 170 $m^2/g$.

The process oil used is Vivatec 500 from Hansen & Rosenthal KG. Vulkanox 4020 (6PPD), Vulkacit CZ (CBS) and Vulkacit D (DPG) are commercial products from Lanxess Deutschland GmbH, and Protektor G3108 is an antiozonant wax from Paramelt B.V. The coactivator Perkacit Richon TBzTD (tetrabenzylthiuram tetrasulfide) is a product from Weber & Schaer GmbH & Co KG.

Corax N330 is a commercial carbon black from Orion Engineered Carbons GmbH.

The mixtures are prepared in three stages in a 1.5 l internal mixer (E-type) at a batch temperature of 155° C. in accordance with the mixing instructions described in Table 2.

TABLE 2

Stage 1

| Settings | |
|---|---|
| Mixing unit | HF Mixing Group GmbH; type GK 1.5 E |
| Fill level | 0.73 |
| Speed | 80 $min^{-1}$ |
| Ram pressure | 5.5 bar |
| Flow temp. | 80° C. |

| Mixing procedure | |
|---|---|
| 0 to 0.5 min | Rubbers |
| 0.5 to 1.0 min | 6 PPD, TMQ |
| 1.0 to 2.0 min | ½ of silica, silane, ZnO, fatty acid |
| 2.0 min | vent and purge |
| 2.0 to 3.0 min | ½ of silica, carbon black, TDAE oil, antiozonant wax |
| 3.0 min | vent |
| 3.0 to 5.0 min | mix at 140-155° C., optionally adjusting temperature by varying speed |
| 5.0 min | discharge batch and form a milled sheet on laboratory mixing roll mill for 45 s (laboratory roll mill: diameter 250 mm, length 190 mm, roll nip 4 mm, flow temperature 60° C.) 24 h storage at room temperature |

Stage 2

| Settings | |
|---|---|
| Mixing unit | as in stage 1 except |
| Fill level | 0.69 |
| Speed | 80 $min^{-1}$ |
| Flow temp. | 90° C. |

| Mixing procedure | |
|---|---|
| 0 to 1.0 min | break up stage 1 batch |
| 1.0 to 3.0 min | mix at 140-155° C., optionally adjusting temperature by varying speed |
| 3.0 min | discharge batch and form a milled sheet on laboratory mixing roll mill for 45 s (laboratory roll mill: diameter 250 mm, length 190 mm, roll nip 4 mm, flow temperature 60° C.) 3 h storage at room temperature |

Stage 3

| Settings | |
|---|---|
| Mixing unit | as in stage 1 except |
| Fill level | 0.67 |
| Speed | 40 $min^{-1}$ |
| Flow temp. | 50° C. |

| Mixing procedure | |
|---|---|
| 0 to 2.0 min | break up stage 2 batch, accelerator and sulfur, mix at 100° C., optionally adjusting temperature by varying speed |
| 2.0 min | discharge batch and form a milled sheet on laboratory mixing roll mill for 20 s (laboratory roll mill: diameter 250 mm, length 190 mm, roll nip 4 mm, flow temperature 80° C.) |

The general process for producing rubber mixtures and vulcanizates thereof is described in "Rubber Technology Handbook", W. Hofmann, Hanser Verlag 1994.

Rubber testing is effected in accordance with the test methods specified in Table 3.

TABLE 3

| Physical testing | Standard/conditions |
| --- | --- |
| ML 1 + 4, 100° C. (3rd stage) | ISO 289-1 |
| Vulkameter test, 165° C. | ISO 6502 |
| $M_H - M_L$ | |
| t10% | |
| t80%-t20% | |
| Bar tensile test, 23° C. | ISO 37 |
| Shore A hardness, 23° C. | ISO 7619-1 |
| Ball rebound, 60° C. | ISO 8307 |
| | Drop height 500 mm |
| | Steel ball 19 mm, 28 g |
| Abrasion resistance, determined with an instrument with a rotating cylinder drum, 10N | ISO 4649 |
| Viscoelastic properties | ISO 4664-1 |
| 0 and 60° C., 16 Hz, initial force 50N and amplitude force 25N | |
| Complex modulus E* (MPa) | |
| Loss factor tan δ (—) | |

All mixtures are used to produce test specimens by vulcanization under pressure at 165° C. for fifteen minutes. Table 4 states the rubber data obtained.

TABLE 4

| | | Reference mixture I | Reference mixture II | Reference mixture III | Example mixture I | Example mixture II | Example mixture III |
| --- | --- | --- | --- | --- | --- | --- | --- |
| ML(1 + 4) [100° C.] MDR: 165° C.; 0.5° | ME | 61 | 80 | 96 | 64 | 50 | 44 |
| $M_L$ | dNm | 2.4 | 2.8 | 4.1 | 2.7 | 2.0 | 1.6 |
| $M_H$ | dNm | 19.6 | 15.2 | 27.3 | 25.7 | 23.2 | 20.1 |
| $M_{H-ML}$ | dNm | 17.2 | 12.4 | 23.2 | 23.0 | 21.2 | 18.5 |
| t 10% | min | 1.5 | 0.6 | 0.3 | 0.6 | 1.5 | 3.1 |
| t 20% | min | 3.6 | 0.8 | 0.9 | 3.0 | 4.0 | 4.4 |
| t 90% | min | 14.5 | 3.1 | 7.5 | 7.3 | 7.8 | 8.4 |
| t 80% – t 20% | min | 6.4 | 1.3 | 5.2 | 3.2 | 2.6 | 2.5 |
| Bar tensile test (6 S1 bars, 23° C.) | | | | | | | |
| Tensile strength | MPa | 15.4 | 16.6 | 15.3 | 17.6 | 16.3 | 15.5 |
| 100% modulus | MPa | 2.2 | 2.6 | 3.0 | 2.4 | 2.3 | 2.2 |
| 300% modulus | MPa | 9.3 | 14.6 | 12.5 | 11.4 | 10.5 | 9.8 |
| 300%/100% modulus | — | 4.2 | 5.6 | 4.2 | 4.8 | 4.6 | 4.5 |
| Elongation at break | % | 442 | 330 | 352 | 417 | 415 | 425 |
| Shore A hardness | SH | 63 | 59 | 70 | 67 | 65 | 62 |
| Abrasion resistance | mm³ | 72 | 51 | 70 | 74 | 78 | 89 |
| Ball rebound, 60° C. Zwick, 16 Hz, 50N +/− 25N | % | 59.5 | 71.7 | 59.9 | 62.5 | 64.8 | 64.0 |
| E*; 0° C. | MPa | 20.7 | 12.2 | 41.0 | 20.0 | 14.2 | 12.4 |
| E*; 60° C. | MPa | 8.8 | 7.6 | 16.3 | 9.7 | 8.3 | 7.4 |
| tan δ; 0° C. | — | — | 0.439 | 0.353 | 0.311 | 0.392 | 0.354 | 0.349 |
| tan δ; 60° C. | — | — | 0.153 | 0.093 | 0.151 | 0.127 | 0.105 | 0.100 |

All three example mixtures have a lower Mooney viscosity ML (1+4) [100° C.] than the reference mixtures II and III containing the silanes known from the prior art. The comparison with the reference mixture I containing the conventional silane Si 266® shows that the advantageous rubber values profile of the reference mixtures II and III is maintained in the example mixtures. The modulus at 300% elongation and the 300%/100% modulus strengthening index are still at a much higher level compared to reference mixture I. The hysteresis loss, expressed by the distinct lowering in the tan δ, 60° C. value, is greatly reduced.

It is surprising, and unexpected to the person skilled in the art, that the example mixture I having the lowest dosage of the silanes according to the invention has the most balanced rubber values profile. It has the highest dynamic modulus E*, 0° C. of the example mixtures. The Mooney viscosity is in the same order of magnitude as reference mixture I containing the conventional silane Si 266®. There is an increase in tensile strength compared to the reference mixtures II and Ill. At the same time, it has a higher elongation at break.

Example 5

In this example, the silanes according to the invention in a natural rubber-containing rubber mixture are compared to the benzothiazole-containing silanes known from the prior art.

The formulation used for the rubber mixtures is specified in Table 5 below. The unit phr again means parts by weight based on 100 parts of the raw rubber used. The silane dosages are matched to the amount of silica used.

The inventive silane I used for example mixture I is the inventive silane prepared in Example I. The structure thereof corresponds to the general formula I
with $R^1$=ethoxy, $R^2$=O(C$_2$H$_4$O)$_5$C$_{13}$H$_{27}$, $R^3$=—CH$_2$CH$_2$CH$_2$— and n=2.

The inventive silane II used for example mixture II is the inventive silane prepared in Example II.

The structure thereof corresponds to the general formula I
with $R^1$=ethoxy, $R^2$=O(C$_2$H$_4$O)$_5$C$_{13}$H$_{27}$, $R^3$=—CH$_2$CH$_2$CH$_2$— and n=1.

The inventive silane III used for example mixture III is the inventive silane prepared in Example III.

The structure thereof corresponds to the general formula I
with $R^2$=O(C$_2$H$_4$O)$_5$C$_{13}$H$_{27}$, $R^3$=—CH$_2$CH$_2$CH$_2$— and n=0.

The silanes Si 266® and Si 363™ used for the reference mixtures I and II are commercially available from Evonik Industries AG. The silane used for reference mixture III is 2-[[3-(triethoxysilyl)propyl]dithio]benzothiazole, prepared in Comparative Example 1. The other chemicals are obtainable as described in Example 4.

The silanes according to the invention are used in equimolar dosages.

TABLE 5

|  |  | Reference mixture I | Reference mixture II | Reference mixture III | Example mixture I | Example mixture II | Example mixture III |
|---|---|---|---|---|---|---|---|
| Stage 1 |  |  |  |  |  |  |  |
| SMR 10 | phr | 100.0 | 100.0 | 100.0 | 100.0 | 100.0 | 100.0 |
| N234 | phr |  |  |  |  |  |  |
| ULTRASIL ® 7000 GR | phr | 55.0 | 55.0 | 55.0 | 55.0 | 55.0 | 55.0 |
| Si 266 ® | phr | 5.0 |  |  |  |  |  |
| Si 363 ™ | phr |  | 6.2 |  |  |  |  |
| 2-[[3(Triethoxysilyl)propyl]-dithio]benzothiazole | phr |  |  | 2.5 |  |  |  |
| Silane from Example 1 | phr |  |  |  | 4.9 |  |  |
| Silane from Example 2 | phr |  |  |  |  | 7.2 |  |
| Silane from Example 3 | phr |  |  |  |  |  | 9.6 |
| Stearic acid | phr | 3.0 | 3.0 | 3.0 | 3.0 | 3.0 | 3.0 |
| ZnO | phr | 3.0 | 3.0 | 3.0 | 3.0 | 3.0 | 3.0 |
| 6-PPD | phr | 1.0 | 1.0 | 1.0 | 1.0 | 1.0 | 1.0 |
| TMQ | phr | 1.0 | 1.0 | 1.0 | 1.0 | 1.0 | 1.0 |
| Wax | phr | 1.0 | 1.0 | 1.0 | 1.0 | 1.0 | 1.0 |
| Stage 2 |  |  |  |  |  |  |  |
| First stage batch |  |  |  |  |  |  |  |
| Stage 3 |  |  |  |  |  |  |  |
| Second stage batch |  |  |  |  |  |  |  |
| CBS | phr | 1.0 | 1.0 | 1.0 | 1.0 | 1.0 | 1.0 |
| Sulfur | phr | 2.0 | 2.0 | 2.0 | 2.0 | 2.0 | 2.0 |

The mixtures are prepared in three stages in a 1.5 l internal mixer (E-type) at a batch temperature of 150° C. in accordance with the mixing instructions described in Table 6. All mixtures were used to produce test specimens by vulcanization under pressure at 150° C. Rubber testing is effected in accordance with the test methods specified in Table 3. The results are shown in Table 7.

TABLE 6

| Stage 1 | |
|---|---|
| Settings | |
| Mixing unit | HF Mixing Group GmbH; type GK 1.5 E |
| Fill level | 0.73 |
| Speed | 80 min$^{-1}$ |
| Ram pressure | 5.5 bar |
| Flow temp. | 80° C. |
| Mixing procedure | |
| 0 to 0.5 min | Rubber |
| 0.5 to 1.5 min | ½ of silica, silane, ZnO, fatty acid |
| 1.5 min | vent and purge |
| 1.5 to 2.5 min | ½ of silica, 6 PPD, TMQ, antiozonant wax |
| 2.5 min | vent and purge |
| 2.5 to 4.0 min | mix at 140-155° C. |
| 4.0 min | vent |
| 4.0 to 5.5 min | mix at 140-155° C., optionally adjusting temperature by varying speed |
| 5.5 min | discharge batch and form a milled sheet on laboratory mixing roll mill for 45 s (laboratory roll mill: diameter 250 mm, length 190 mm, roll nip 4 mm, flow temperature 60° C.) 23 h storage at room temperature |

TABLE 6-continued

| Stage 2 | |
|---|---|
| Settings | |
| Mixing unit | as in stage 1 except |
| Fill level | 0.69 |
| Speed | 80 min$^{-1}$ |
| Flow temp. | 90° C. |
| Mixing procedure | |
| 0 to 1.0 min | break up stage 1 batch |
| 1.0 to 3.0 min | mix at 140-155° C., optionally adjusting temperature by varying speed |
| 3.0 min | discharge batch and form a milled sheet on laboratory mixing roll mill for 45 s (laboratory roll mill: diameter 250 mm, length 190 mm, roll nip 4 mm, flow temperature 60° C.) 3 h storage at room temperature |
| Stage 3 | |
| Settings | |
| Mixing unit | as in stage 1 except |
| Fill level | 0.67 |
| Speed | 40 min$^{-1}$ |
| Flow temp. | 50° C. |
| Mixing procedure | |
| 0 to 2.0 min | break up stage 2 batch, accelerator and sulfur, mix at 100° C., optionally adjusting temperature by varying speed |
| 2.0 min | discharge batch and form a milled sheet on laboratory mixing roll mill for 20 s (laboratory roll mill: diameter 250 mm, length 190 mm, roll nip 4 mm, flow temperature 80° C.) |

TABLE 7

|  |  | Reference Mixture I | Reference mixture II | Reference Mixture III | Example mixture I | Example mixture II | Example mixture III |
|---|---|---|---|---|---|---|---|
| ML(1 + 4) [100° C.] | ME | 60 | 58 | 65 | 63 | 58 | 53 |
| MDR: 150° C.; 0.5° |  |  |  |  |  |  |  |
| $M_L$ | dNm | 2.2 | 2.1 | 2.1 | 2.2 | 2.1 | 1.9 |
| $M_H$ | dNm | 11.7 | 10.4 | 12.5 | 12.6 | 12.3 | 12.5 |
| $M_H - M_L$ | dNm | 9.5 | 8.4 | 10.3 | 10.5 | 10.2 | 10.6 |
| t 10% | min | 8.3 | 2.7 | 3.2 | 9.5 | 12.0 | 11.9 |
| t 20% | min | 11.7 | 3.9 | 8.5 | 12.8 | 14.1 | 13.9 |
| t 90% | min | 29.2 | 15.3 | 23.2 | 22.6 | 21.8 | 20.9 |
| t 80% − t 120% | min min | 12.6 | 7.7 | 10.6 | 7.1 | 5.6 | 5.1 |
| Vulcanization time (150° C.) | min | 43 | 26 | 37 | 32 | 30 | 30 |
| Tensile strength (6 S1 bars, 23° C.) | MPa | 16.2 | 15.8 | 13.7 | 21.6 | 21.8 | 22.4 |
| 100% modulus | MPa | 1.0 | 1.0 | 1.0 | 1.2 | 1.2 | 1.1 |
| 300% modulus | MPa | 3.4 | 3.2 | 2.9 | 4.1 | 4.4 | 4.2 |
| 300%/100% modulus | — | 3.4 | 3.2 | 2.9 | 3.4 | 3.7 | 3.8 |
| Elongation at break | % | 719 | 732 | 706 | 795 | 778 | 791 |
| Shore A hardness | SH | 54 | 50 | 48 | 52 | 54 | 54 |
| Abrasion resistance | mm³ | 230 | 295 | 299 | 178 | 152 | 149 |
| Ball rebound, 60° C. Zwick; 16 Hz; 50N +/− 25N | % | 65.4 | 69.0 | 69.4 | 69.5 | 71.2 | 72.0 |
| E*; 0° C. | MPa | 9.0 | 7.8 | 7.6 | 7.3 | 7.5 | 7.1 |
| E*; 60° C. | MPa | 6.3 | 5.5 | 6.0 | 5.6 | 6.0 | 5.7 |
| tan δ; 0° C. | — | 0.241 | 0.227 | 0.201 | 0.208 | 0.216 | 0.209 |
| tan δ; 60° C. | — | 0.144 | 0.124 | 0.142 | 0.113 | 0.093 | 0.085 |

For all three example mixtures, the Mooney viscosities are below that of reference mixture III. All example mixtures have a higher tensile strength and higher 300% moduli than the three reference mixtures. At the same time, there is an increase in elongation at break for all of them. The increased values for 60° C. ball rebound and the lower tan 5, 60° C. values compared to the reference are further advantages.

The invention claimed is:

1. A benzothiazole-containing silane of the formula (I):

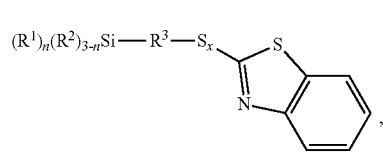

(I)

wherein:
R¹ is the same or different and is an R⁴O— group with R⁴ being H, methyl, ethyl, propyl, C9-C30 branched or unbranched monovalent alkyl, alkenyl, aryl or aralkyl group,
R² is an alkyl polyether group —O—(R⁵—O)$_m$—R⁶ with R⁵ being the same or different and being a branched or unbranched, saturated or unsaturated, aliphatic divalent C1-C30 hydrocarbon group, m is 1 to 30, and R⁶ is a branched or unbranched C1-C30-alkyl group,
R³ is a branched or unbranched, saturated or unsaturated, aliphatic, aromatic or mixed aliphatic/aromatic divalent C1-C30 hydrocarbon group, and
x=2-10, and
n=0, 1 or 2.

2. The benzothiazole-containing silane according to claim 1, wherein R¹ is methoxy or ethoxy.

3. The benzothiazole-containing silane according to claim 1, wherein R²=—O—(CH₂CH₂O)₅—C₁₃H₂₇.

4. The benzothiazole-containing silane according to claim 1, wherein:
R¹=—O—C₂H₅,
R²=—O—(CH₂CH₂O)₅—C₁₃H₂₇,
R³=(CH₂)₃,
X=2, and
n=2.

5. A process for preparing the benzothiazole-containing silane of claim 1, comprising:
reacting a benzothiazole-containing silane of the formula (II):

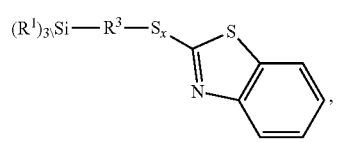

(II)

with a compound of formula (III):

R²—H  (III), to obtain the benzothiazole-containing silane,
wherein:
R¹ is the same or different and is an R⁴O— group with R⁴ being H, methyl, ethyl, propyl, C9-C30 branched or unbranched monovalent alkyl, alkenyl, aryl or aralkyl group,
R² is an alkyl polyether group —O—(R⁵—O)$_m$—R⁶ with R⁵ being the same or different and being a branched or unbranched, saturated or unsaturated, aliphatic divalent C1-C30 hydrocarbon group, m is 1 to 30, and R⁶ is a branched or unbranched C1-C30-alkyl group, R³ is a branched or unbranched, saturated or unsaturated, aliphatic, aromatic or mixed aliphatic/aromatic divalent C1-C30 hydrocarbon group, and x=2-10, and n=0, 1 or 2.

6. The process according to claim 5, wherein the reaction is conducted in the presence of a catalyst with elimination of R¹—H.

7. A filled rubber mixture, comprising the benzothiazole-containing silane of claim 1 as a coupling reagent.

8. A rubber mixture, comprising:
(A) a rubber or a mixture of rubbers,
(B) a filler, and
(C) at least one benzothiazole-containing silane of claim 1.

9. The rubber mixture according to claim 8, wherein a ratio of the at least one benzothiazole-containing silane to a vulcanization accelerator contained in the rubber mixture is greater than 5.

10. The rubber mixture according to claim 8, comprising a natural rubber.

\* \* \* \* \*